(12) United States Patent
Jung et al.

(10) Patent No.: US 9,024,913 B1
(45) Date of Patent: May 5, 2015

(54) TOUCH SENSING DEVICE AND DRIVING METHOD THEREOF

(71) Applicant: LG Display Co., Ltd., Seoul (KR)

(72) Inventors: Jihyun Jung, Paju-si (KR); Deuksu Lee, Goyang-si (KR); Jaeseung Kim, Goyang-si (KR); Taeyun Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/450,960

(22) Filed: Aug. 4, 2014

(30) Foreign Application Priority Data

Apr. 28, 2014 (KR) .......................... 10-2014-0050727
Apr. 29, 2014 (KR) .......................... 10-2014-0051609

(51) Int. Cl.
*G06F 3/044* (2006.01)
*G09G 3/36* (2006.01)

(52) U.S. Cl.
CPC .............. *G06F 3/044* (2013.01); *G09G 3/3696* (2013.01)

(58) Field of Classification Search
CPC ...... G06F 3/044; G06F 3/0412; G09G 3/3696
USPC ...................... 345/173, 174; 178/18.01–19.06
See application file for complete search history.

(56) References Cited

U.S. PATENT DOCUMENTS

| | | | | |
|---|---|---|---|---|
| 2008/0309627 | A1* | 12/2008 | Hotelling et al. | 345/173 |
| 2010/0194707 | A1* | 8/2010 | Hotelling et al. | 345/173 |
| 2011/0050585 | A1* | 3/2011 | Hotelling et al. | 345/173 |
| 2011/0128254 | A1* | 6/2011 | Teranishi et al. | 345/174 |
| 2012/0162090 | A1* | 6/2012 | Chang et al. | 345/173 |
| 2012/0162134 | A1* | 6/2012 | Chen et al. | 345/174 |
| 2013/0141343 | A1* | 6/2013 | Yu et al. | 345/173 |
| 2013/0278557 | A1* | 10/2013 | Hotelling et al. | 345/174 |
| 2013/0321296 | A1* | 12/2013 | Lee et al. | 345/173 |
| 2014/0049509 | A1* | 2/2014 | Shepelev et al. | 345/174 |
| 2014/0062907 | A1* | 3/2014 | Kim | 345/173 |
| 2014/0085222 | A1* | 3/2014 | Park et al. | 345/173 |
| 2014/0118277 | A1* | 5/2014 | Kim et al. | 345/173 |
| 2014/0132534 | A1* | 5/2014 | Kim | 345/173 |
| 2014/0139480 | A1* | 5/2014 | Seo et al. | 345/174 |
| 2014/0160062 | A1* | 6/2014 | Kim | 345/174 |
| 2014/0160086 | A1* | 6/2014 | Lee et al. | 345/178 |
| 2014/0210774 | A1* | 7/2014 | Kim et al. | 345/174 |
| 2014/0240279 | A1* | 8/2014 | Hwang et al. | 345/174 |
| 2014/0267087 | A1* | 9/2014 | Yousefpor et al. | 345/173 |

* cited by examiner

*Primary Examiner* — Priyank Shah

(74) *Attorney, Agent, or Firm* — Fenwick & West LLP

(57) ABSTRACT

A touch sensing device and a driving method thereof are provided. The driving method comprises short-circuiting touch sensors by connecting sensor lines to supply a common voltage to the sensor lines through one end and the other end of the sensor lines during a display driving period.

23 Claims, 18 Drawing Sheets

TOUCH SENSING DEVICE AND DRIVING METHOD THEREOF

This application claims the benefit of Korea Patent Application No. 10-2014-0050727 filed on Apr. 28, 2014 and Korea Patent Application No. 10-2014-0051609 filed on Apr. 29, 2014, each of which is incorporated herein by reference in its entirety.

BACKGROUND

1. Field

This document relates to a touch sensing device with touch sensors embedded within a pixel array and a driving method thereof.

2. Related Art

A user interface (UI) is configured so that users are able to communicate with various electronic devices and thus can easily and comfortably control the electronic devices as they desire. Examples of the user interface include a keypad, a keyboard, a mouse, an on-screen display (OSD), and a remote controller having an infrared communication function or a radio frequency (RF) communication function. User interface technologies have continuously evolved to increase user's sensibility and handling convenience. The user interface has been recently developed to touch UI, voice recognition UI, three-dimensional (3D) UI, etc.

The touch UI has been installed in portable information devices such as smartphones, and widely applied to laptop computers, computer monitors, home appliances, etc. The technology of embedding touch sensors into a pixel array of a display panel (hereinafter, "in-cell touch sensor technology") has been recently proposed. The in-cell touch sensor technology allows for installing touch sensors in the display panel without increasing the thickness of the display panel. The touch sensors are connected to pixels through parasitic capacitance. In a driving method thereof, a period for driving pixels (hereinafter, "display driving period") and a period for driving touch sensors (hereinafter, "touch sensor driving period") are time-divided in order to reduce mutual effects caused by the coupling between the pixels and the touch sensors.

The in-cell touch sensor technology uses an electrode connected to the pixels of the display panel as electrodes for the touch sensors. For example, the in-cell touch sensor technology may use the method of dividing a common electrode into sections to supply a common voltage to the pixels of a liquid crystal display device and using the sections of the common electrodes as electrodes for the touch sensors. The same common voltage should be applied to all of the pixels; however, the common voltage becomes non-uniform on a large screen when the common electrode is divided into sections for the touch sensors, which may lead to picture quality degradation.

Referring to FIGS. 1 to 3, a common electrode COM is divided into a plurality of sensors C1 to C4 using the in-cell touch sensor technology. Sensor lines L1 to L4 are connected to the sensors C1 to C4, respectively.

During the display driving period Td, the common voltage Vcom for pixels is supplied to the sensors C1 to C4 through the sensor lines L1 to L4. During the touch sensor driving period Tt, a sensor driving signal Tdrv is supplied to the sensors C1 to C4 through the sensor lines L1 to L4.

The length of the sensor lines L1 to L4 differs depending on the positions of touch sensors. The differences in length between the sensors lines L1 to L4 cause variations in the delay time of the common voltage Vcom applied to the sensor C1 to C4 with the touch sensor positions, resulting in non-uniform picture quality.

For example, as shown in FIG. 3, the delay time of the common voltage Vcom applied to the first sensor C1 through the first sensor line L1 is longer than the delay time of the common voltage Vcom applied to the fourth sensor C4 through the fourth sensor line L4. This is because the first sensor line L1 is longer than the fourth sensor line L4, leading to longer resistor-capacitor RC delay. Accordingly, the first sensor C1 has a lower voltage than the fourth sensor C4 even if the same voltage is applied to the first and fourth sensor lines L1 and L4. Due to the RC delay, the delay time of the sensor driving signal Tdrv also varies depending on the touch sensor positions.

On a large screen display device, the differences in length between the sensor lines L1 to L4 are large. Therefore, the conventional in-cell touch sensor technology makes non-uniform the common voltage Vcom applied through the sensor C1 to C4 during the display driving period Td on a large screen display device, causing degradation in the display device's picture quality.

A large-screen display device has larger parasitic capacitance than a smaller display device due to the coupling between in-cell touch sensors and pixels. If the size and resolution of a touch screen increases, the parasitic capacitance increases. This results in a reduction in touch sensitivity and touch recognition accuracy. Therefore, there arises the need to apply the in-cell touch sensor technology to the touch screen of a large-screen display device to minimize the parasitic capacitance of the touch sensors.

SUMMARY

An aspect of the embodiments herein is to provide a touch sensing device which makes uniform the common voltage applied to pixels in a display device comprising in-cell touch sensors and increases touch sensitivity and touch recognition accuracy, and a driving method thereof.

In one embodiment, a touch sensing device comprises: signal lines connected to pixels of the touch sensing device; sensor lines connected to touch sensors of the touch sensing device; a first feeding unit that supplies a common voltage to a first end of the sensor lines during a display driving period of the touch sensing device and supplies a touch driving signal to the first end of the sensor lines during a touch sensor driving period; and a second feeding unit that supplies the common voltage to a second end of the sensor lines during the display driving period to connect together the touch sensors.

The second feeding unit isolates the sensor lines during the touch sensor driving period. In one embodiment, a driving method of a touch sensing device comprises: connecting the sensor lines to supply a common voltage to the sensor lines through one end and the other end of the sensor lines during a display driving period; and isolating the sensor lines and supplying a touch driving signal to one end of the sensor lines during a touch sensor driving period.

In one embodiment, a touch sensing device comprises a plurality of touch sensors formed in a column, the plurality of touch sensors including a first touch sensor and a second touch sensor formed below the first touch sensor in the column; a first sensor line coupled to the first touch sensor, the first sensor line having a first length and including a first end and a second end; a second sensor line coupled to the second touch sensor, the second sensor line having a second length substantially same as the first length of the first sensor line and the second sensor line including a first end and a second end;

a first component coupled to both the first end of the first sensor line and the first end of the second sensor line, the first component configured to supply a reference signal to both the first end of the first sensor line and the first end of the second sensor line during a display driving period; and a second component coupled to both the second end of the first sensor line and the second end of the second sensor line, the second component configured to supply the reference signal to both the second end of the first sensor line and to the second end of the second sensor line during the display driving period.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Figure 1:
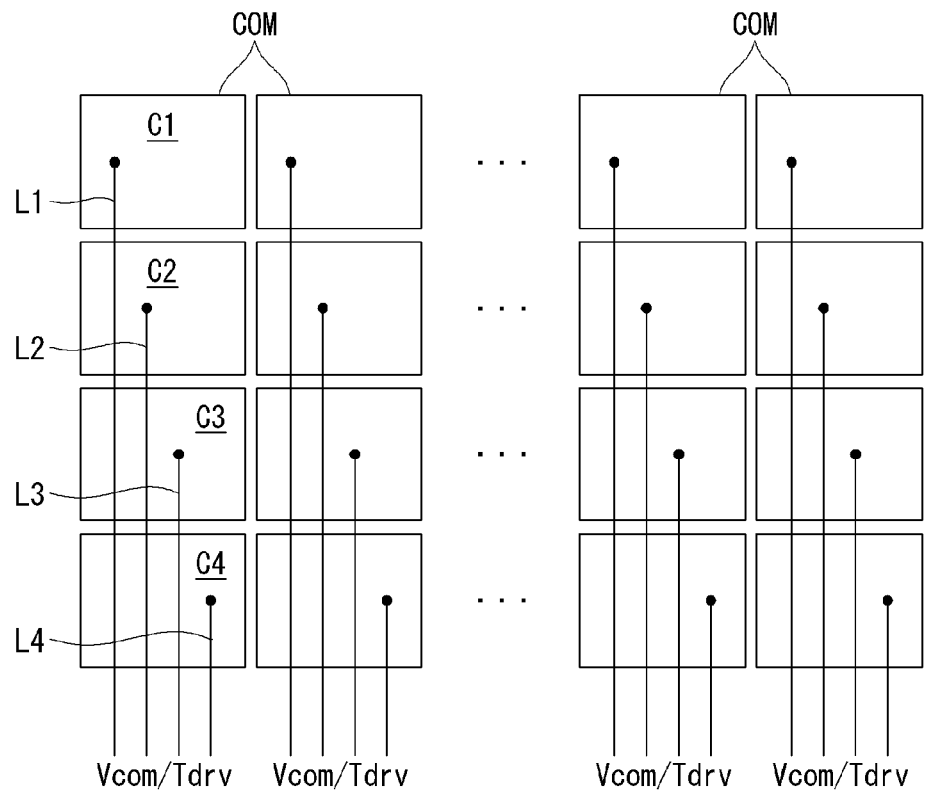
FIG. 1 is a view showing sensor lines connected to touch sensors.

Hereinafter, an implementation of this document will be described in detail with reference to the attached drawings. Throughout the specification, like reference numerals denote substantially like components. Hereinafter, the detailed description of related known functions or configurations that may unnecessarily obscure the subject matter of the present invention in describing the present invention will be omitted.

A display device may be implemented as a flat panel display device, such as a liquid crystal display (LCD), a field emission display (FED), a plasma display panel (PDP), an organic light emitting display (OLED), or an electrophoresis (EPD). In an exemplary embodiment that follows, it should be noted that, although a liquid crystal display device will be described as an example of the flat panel display device, the display device is not limited to the liquid crystal display device. For example, the display device may be any display device as long as the in-cell touch sensor technology is applicable to it.

A touch sensing device has a plurality of touch sensors, which are embedded within a pixel array. A common electrode for supplying a common voltage to pixels is divided into electrodes of the touch sensors. During a display driving period, the touch sensing device short-circuits the touch sensors' switching elements by connecting the sensor, and applies a common voltage Vcom to the pixels through the connected sensor. During a touch sensor driving period, the touch sensing device isolates the touch sensors by turning off the switching elements, and applies a touch driving signal to the touch sensors. During the touch sensor period, an AC signal having the same phase as the touch driving signal may be supplied to signal lines connected to the pixels in order to minimize the effect of the parasitic capacitance between the pixels and the touch sensors.

Although the common voltage applied to the pixels of the liquid crystal display device has been given as an example, the embodiments herein are not limited to it. For example, the common voltage should be construed as a voltage commonly supplied to pixels of a flat panel display device, such as a high-potential/low-potential power voltage (VDD/VSS) commonly applied to pixels of an organic light emitting diode display device.

In one embodiment, a touch sensor refers to a capacitance type touch sensor which can be implemented as a touch sensor. Such a touch sensor may be classified as a self capacitance type touch sensor or a mutual capacitance type touch sensor.

When a finger touches the self capacitance type touch sensor, capacitance occurs. A sensing circuit is able to sense a touch position and a touch area by measuring a change in capacitance (or electric charge) caused by an object contacting the self capacitance type touch sensor to which a touch driving signal is applied.

The mutual capacitance type touch sensor uses mutual capacitance that occurs between Tx lines to which the touch driving signal is applied and Rx lines crossing the Tx lines with a dielectric layer (or insulation layer) interposed between them. The touch driving signal is applied to the Tx lines. The sensing circuit is able to sense a touch position and a touch area by receiving a change in the capacitance (or electric charge) of the touch sensor caused by an object contacting the touch sensor. The mutual capacitance type touch sensor can detect multi-touch input more accurately than the self capacitance type touch sensor.

Figure 4:
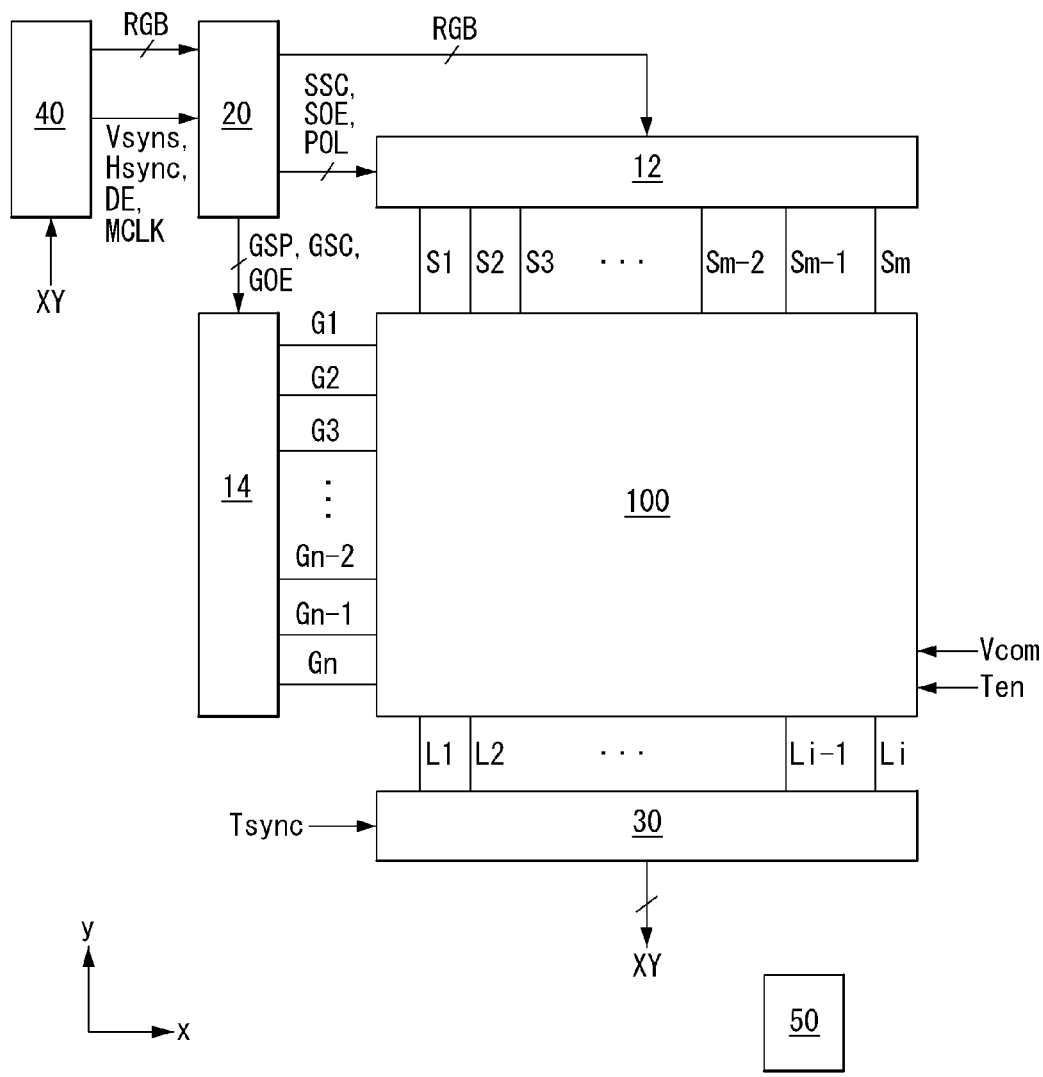
FIG. 4 is a block diagram schematically showing a display device according to one embodiment.

FIG. 4 is a block diagram schematically showing a display device according to one embodiment.

Referring to FIG. 4, a display device comprises a touch sensing device. The touch sensing device senses touch input by using touch sensors embedded in the display panel 100. The touch sensors may be implemented as self capacitance type sensors shown in FIGS. 5 and 6 or mutual capacitance type sensors shown in FIGS. 14 to 17.

In a liquid crystal display device, a liquid crystal layer is formed between two substrates of the display panel 100. Liquid crystal molecules of the liquid crystal layer are driven by an electric field generated by the difference in potential between a data voltage applied to pixel electrodes and a common voltage Vcom applied to a common electrode. A pixel array of the display panel 100 comprises pixels defined by data lines S1 to Sm (m is a positive integer greater than or equal to 2) and gate lines G1 to Gn (n is a positive integer greater than or equal to 2), touch sensors for which the common electrode connected to the pixels is divided into sections, sensor lines L1 to Li connected to the touch sensors, and switching elements (omitted in FIG. 4) connected to the sensor lines L1 to Li (i is a positive integer greater than 0 and less than m).

Figure 5:
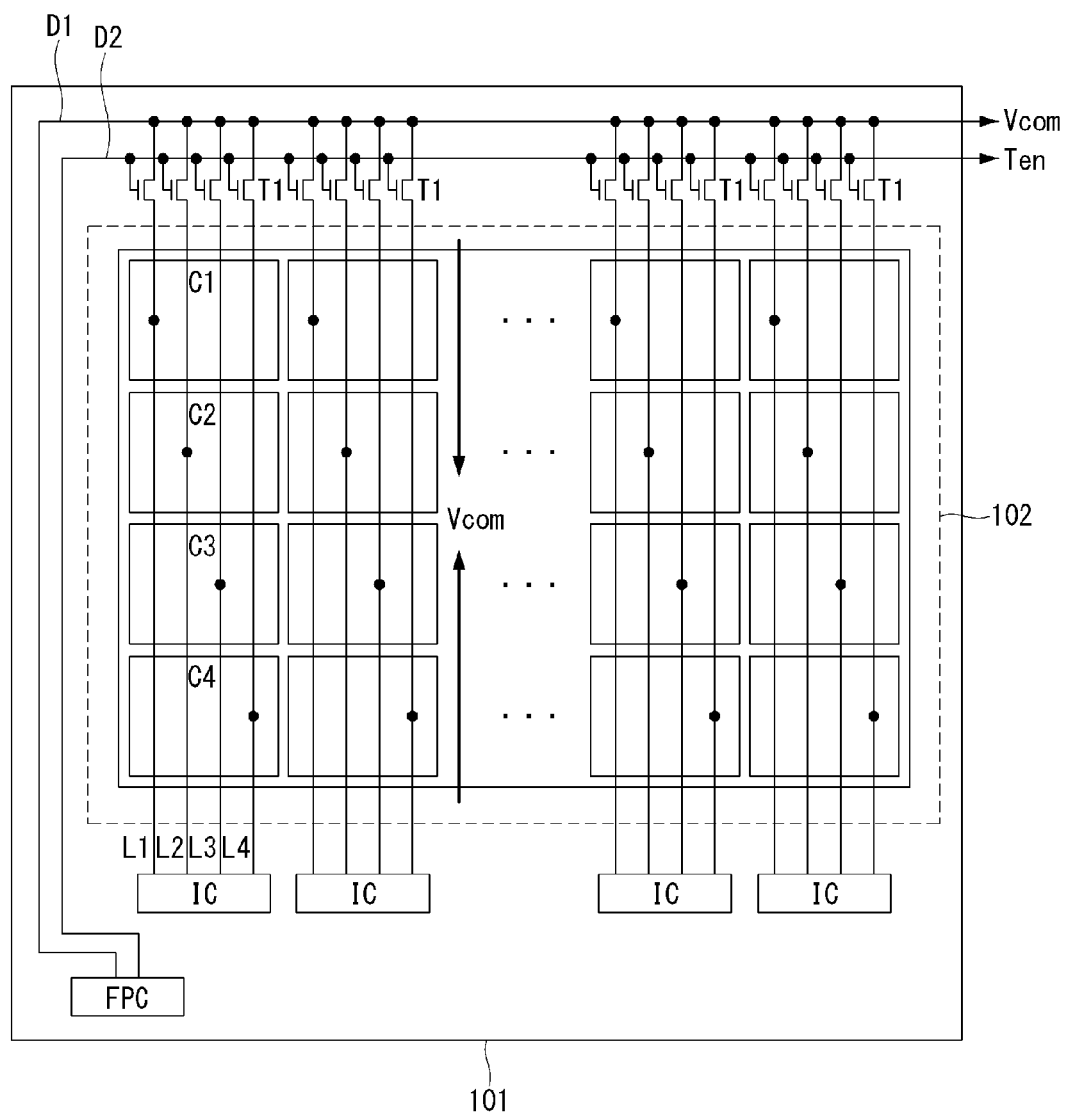
FIGS. 5 and 6 are views illustrating self capacitance type touch sensors according to one embodiment.

The sensors lines L1 to Li are equal in length within the pixel array (or screen). For example, a plurality of touch sensors C1 to C4 formed in a column as shown in FIG. 5. The second touch sensor C2 formed below the first touch sensor C1 in the column. The first sensor line L1 is coupled to the first touch sensor C1. The second sensor line L2 is coupled to the second touch sensor C2. The second sensor line L2 has a length substantially same as a length of the first sensor line L1. The first sensor line L1 includes a first portion and a second portion. The first portion of the first sensor line L1 comprises a connection point to the first touch sensor C1 and the first end of the first sensor line L1 that is coupled to a first feeding unit. The second portion of the first sensor line L1 comprises the connection point to the first touch sensor and the second end of the first sensor line L1 that is coupled to a second feeding unit. The second sensor line L2 includes a first portion and a second portion. The first portion of the second sensor line L2 comprises a connection point to the second touch sensor C2 and the first end of the second sensor line L1 that is coupled to the first feeding unit. The second portion of the second sensor line L2 comprises the connection point to the second touch sensor C2 and the second end of the second sensor line L2 coupled to the second feeding unit. The first portion of the first sensor line L1 is longer than the first portion of the second sensor line L2 and the second portion of the first sensor line L2 is shorter than the second portion of the second sensor line L2. The common voltage Vcom is supplied to the sensors through both ends of the sensor lines L1 to Li during the display driving period Td. The common voltage Vcom may be represented as a reference signal of the pixels.

Each of the pixels comprises pixel TFTs (thin film transistors, T3 of FIG. 11) formed at the crossings of the data lines S1 to Sm and the gate lines G1 to Gn, a pixel electrode for receiving a data voltage through the pixel TFTs T3, a common electrode for receiving the common voltage Vcom, and a storage capacitor Cst connected to the pixel electrode to maintain the voltage of a liquid crystal cell. The common electrode is divided into sections for a plurality of touch sensors during the touch sensor driving period.

A black matrix, color filters, etc may be formed on an upper substrate of the display panel 100. A lower substrate of the display panel 100 may be implemented to have a COT (Color filter On TFT) structure. In this case, the color filters may be formed on the lower substrate of the display panel 100. Polarizers are attached on the upper and lower substrates of the display panel 100, and an alignment film for setting a pre-tilt angle of liquid crystal is formed on the inner surface contacting the liquid crystal. A column spacer for sustaining a cell gap of the liquid crystal layer is formed between the upper and lower substrates of the display panel 100.

A backlight unit may be placed below the back surface of the display panel 100. The backlight unit is implemented as an edge type backlight unit or a direct type backlight unit to irradiate light to the display panel 100. The display panel 100 may be implemented in any well-known liquid crystal mode, such as a TN (Twisted Nematic) mode, a VA (Vertical Alignment) mode, an IPS (In-Plane Switching) mode, and an FFS (Fringe Field Switching) mode. A self-luminous display device such as an organic light emitting diode display device requires no backlight unit.

The display device further comprises a display driving circuits 12, 14, and 20 for writing input image data to the pixels, a sensing circuit 30 for driving the touch sensors, and a power supply unit 50 for generating power.

The display driving circuits 12, 14, and 20 and the sensing circuit 30 are in synchronization with each other in response to a synchronization signal Tsync. The display driving period Td and the touch sensor driving period Tt are time-divided as shown in FIG. 2.

Figure 2:
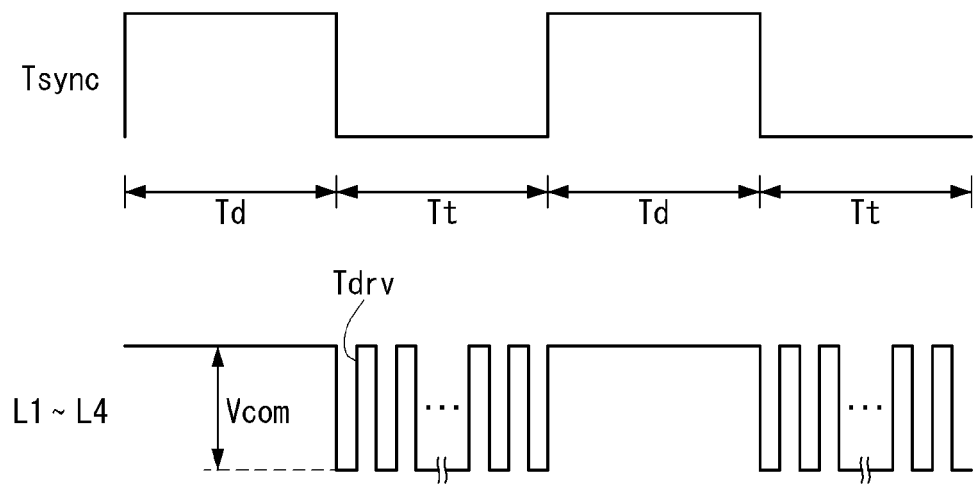
FIG. 2 is a waveform diagram showing a common voltage and a touch driving signal applied to touch sensors according to the in-cell touch sensor technology.
Figure 3:
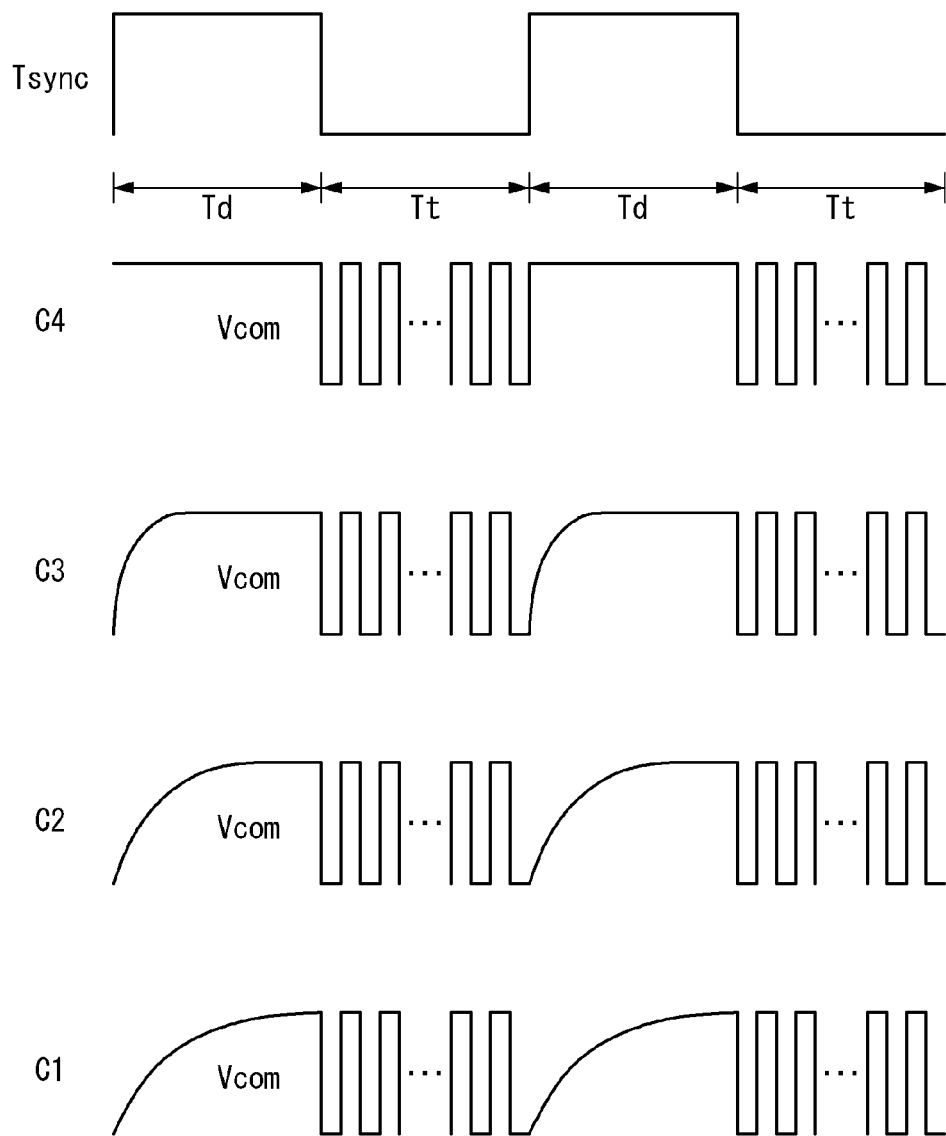
FIG. 3 is a waveform diagram showing variations in the delay time of a common voltage depending on touch sensor positions according to the in-cell touch sensor technology.

The display driving circuits 12, 14, and 20 write data to the pixels during the display driving period (Td of FIG. 2). The pixel TFTs T3 are in the off state during the touch sensor driving period (Tt of FIG. 2), the data voltage charged in the pixels during the display driving period Td is held. The display driving circuits 12, 14, and 20 can supply an AC signal having the same phase as the touch driving signal Tdrv applied to the touch sensors through the sensor lines L1 to Li to the signal lines S1 to Sm and G1 to Gm, in order to minimize the parasitic capacitance between the touch sensors and the signal lines S1 to Sm and G1 to Gn connected to the pixels during the touch sensor driving period Tt. The signal lines connected to the pixels are signal lines for writing data to the pixels, and comprise data lines S1 to Sm for supplying a data voltage to the pixels and gate lines G1 to Gm for supplying a gate pulse (or scan pulse) to select the pixels to which data is written.

The display driving circuits 12, 14, and 20 comprise a data driving circuit 12, a gate driving circuit 14, and a timing controller 20. During the display driving period Td, the data driving circuit 12 converts digital video data RGB of an input image received from the timing controller 20 into an analog positive/negative gamma compensation voltage and outputs a data voltage. The data voltage output from the data driving circuit 12 is supplied to the data lines S1 to Sm. The data driving circuit 12 applies an AC signal having the same phase as the touch driving signal Tdrv applied to the touch sensors during the touch sensor driving period Tt to the data lines S1 to Sm to minimize the parasitic capacitance between the touch sensors and the data lines. This is because the voltages at both ends of the parasitic capacitance change simultaneously and the smaller the voltage difference, the less the amount of electric charge stored in the parasitic capacitance. On the other hand, the touch sensors are electrically charged when the touch driving signal Tdrv is applied to them because the touch sensors are connected to the sensors at one end and connected to the ground GND at the other end.

Figure 12:
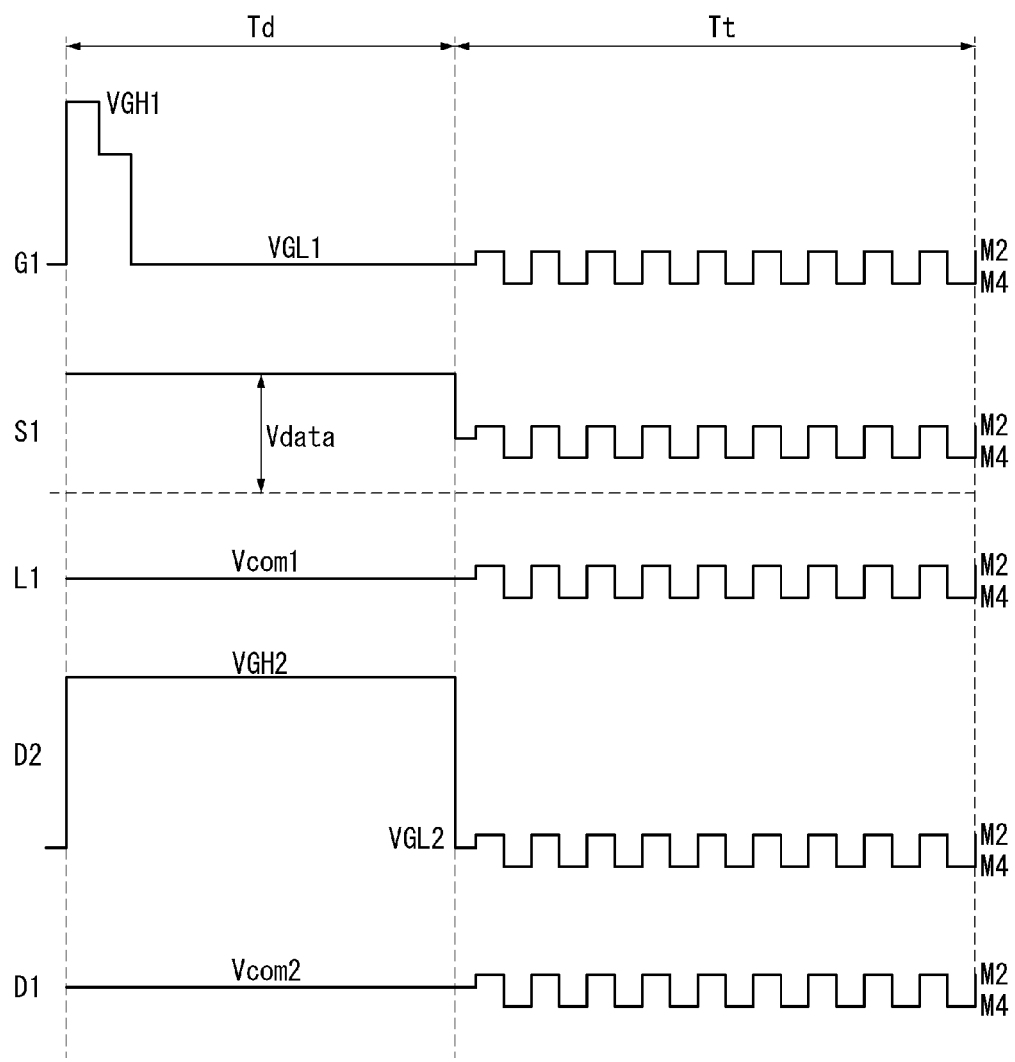
FIGS. 12 and 13 are waveform diagrams showing a pixel driving signal and a touch driving signal that are output from the driving circuit of FIG. 11.
Figure 13:
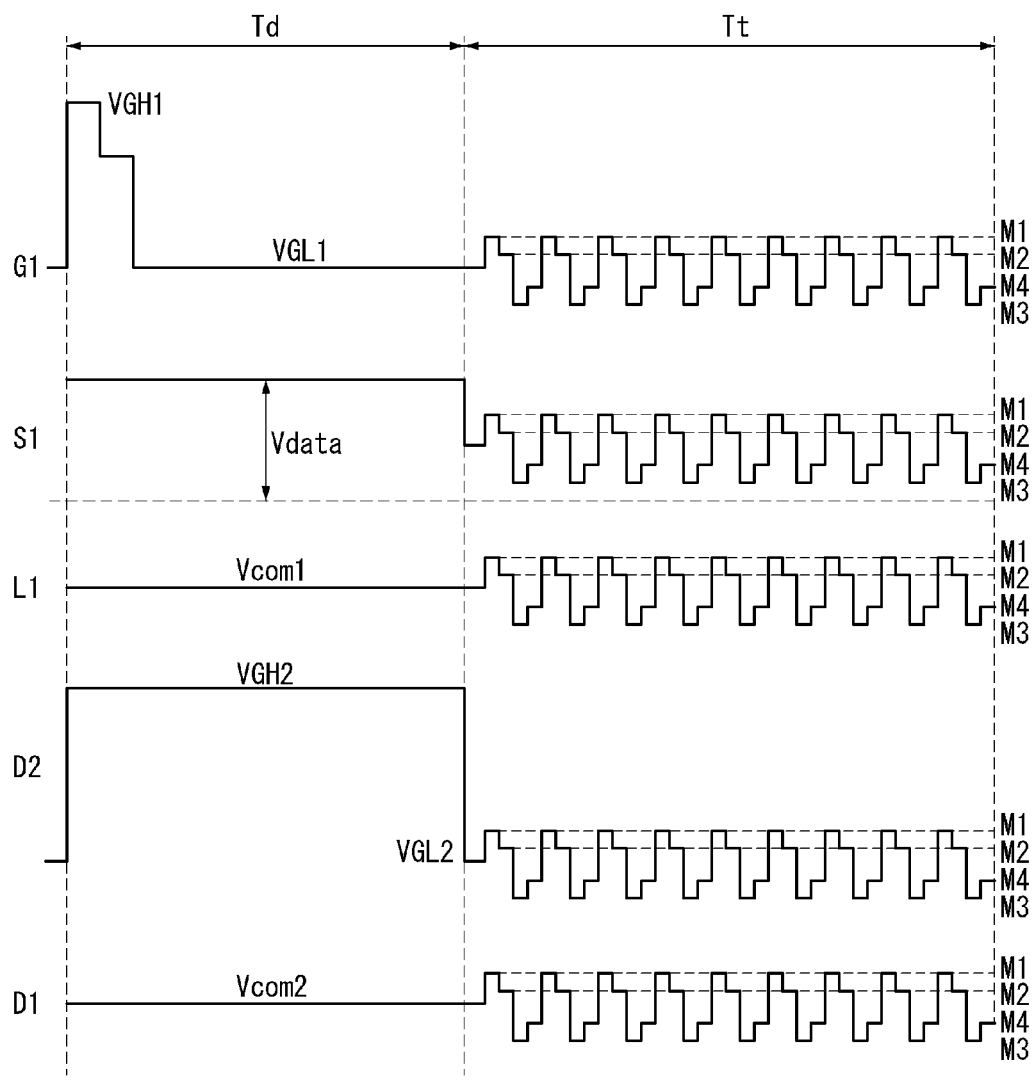

During the display driving period Td, the gate driving circuit 14 sequentially supplies a gate pulse (or scan pulse) synchronized with the data voltage to the gate lines G1 to Gn and selects lines of the display panel 100 to which the data voltage is written. The gate pulse swings between a gate high voltage VGH and a gate low voltage VGL. The gate pulse is applied to the gates of the pixel TFTs T3 through the gate lines G1 to Gn. The gate high voltage VGH is set to a voltage higher than a threshold voltage of the pixel TFTs T3 and turns on the pixel TFTs T3. The gate low voltage VGL is a voltage lower than the threshold voltage of the pixel TFTs T3. The gate driving circuit 14 applies an AC signal having the same phase as the touch driving signal Tdrv applied to the touch sensors during the touch sensor driving period Tt to the gate lines G1 to Gn to minimize the parasitic capacitance between the touch sensors and the gate lines. The voltage of the AC signal applied to the gate lines G1 to Gn during the touch sensor driving period Tt should be lower than the gate high voltage VGH and the threshold voltage of the pixel TFTs T3, as shown in FIGS. 12 and 13, so as to avoid changes in the data written to the pixels.

The timing controller 20 receives timing signals, such as a vertical synchronization signal Vsync, a horizontal synchronization signal Hsync, a data enable signal DE, and a main clock MCLK from a host system 40, and synchronizes operation timings of the data driving circuit 12 and gate driving circuit 14. A scan timing control signal comprises a gate start pulse GSP, a gate shift clock, a gate output enable signal GOE, etc. A data timing control signal comprises a source sampling clock SSC, a polarity control signal POL, a source output enable signal SOE, etc.

The host system 40 may be implemented as any one of the following: a television system, a set-top box, a navigation system, a DVD player, a Blue-ray player, a personal computer PC, a home theater system, and a phone system. The host system 40 comprises a system-on-chip (SoC) having a scaler incorporated therein, and converts digital video data of an input image into a format suitable for the resolution of the display panel 100. The host system 40 transmits the digital video data RGB of the input image and the timing signals Vsync, Hsync, DE, and MCLK to the timing controller 20. Further, the host system 40 executes an application associated with coordinate information XY of touch input from the sensing circuit 30.

The timing controller 20 or the host system 40 may generate a synchronization signal Tsync for synchronizing the display driving circuit 12, 14, and 20 and the sensing circuit.

The common voltage Vcom is applied to the pixels through the touch sensors during the display driving period Td. The touch sensors are short-circuited through switching elements T1, a feed line D1, a feed control line D2, and the sensor lines L1 to L4. Once the touch sensors are short-circuited, the common voltage Vcom is simultaneously supplied in both directions of the sensor lines L1 to L4.

The sensing circuit 30 compares a change in the capacitance of the touch sensors with a predetermined threshold value during the touch sensor driving period Tt, detects touch input if the capacitance change is larger than the threshold value, and senses a touch input position and a touch area. The sensing circuit 30 calculates coordinate information XY of the touch input and transmits it to the host system 40.

Figure 11:
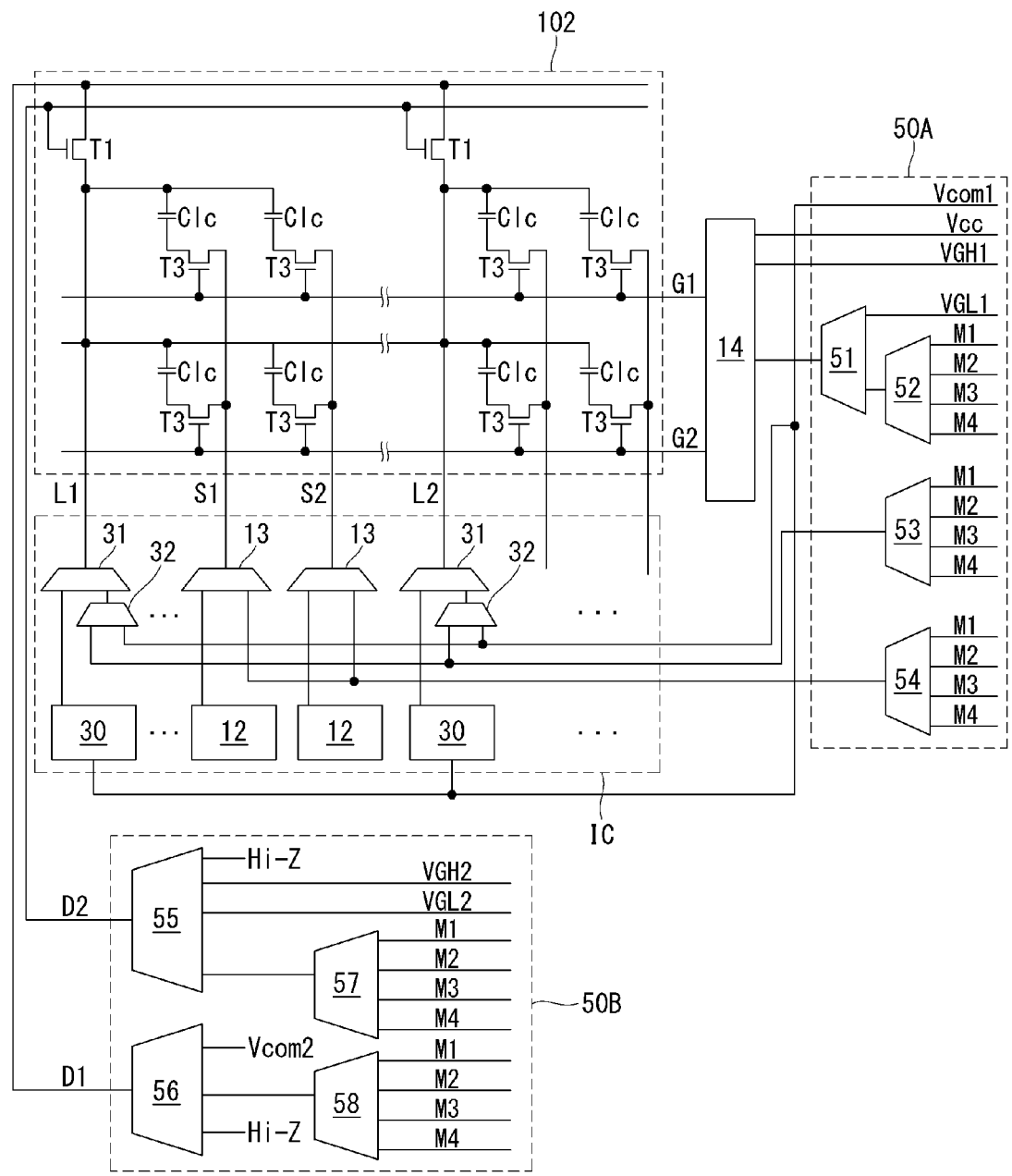
FIG. 11 is a circuit diagram showing in detail a driving circuit of a display device according to one embodiment.

The data driving circuit 12 and the sensing circuit 30 may be integrated within a single IC (Integrated Circuit) as shown in FIGS. 5 and 11 and bonded on the substrates of the display panel in a COG (Chip on glass) process.

The power supply unit 50 supplies the common voltage Vcom to one end of the sensor lines L1 to Li during the display driving period Td. The power supply unit 50 generates a voltage required for the feed line D1 and feed control line D2 of FIG. 5 for double-feeding of the common voltage Vcom. The power supply unit 50 generates an AC signal having the same phase as the touch driving signal Tdrv during the touch sensor driving period Tt.

Figure 6:
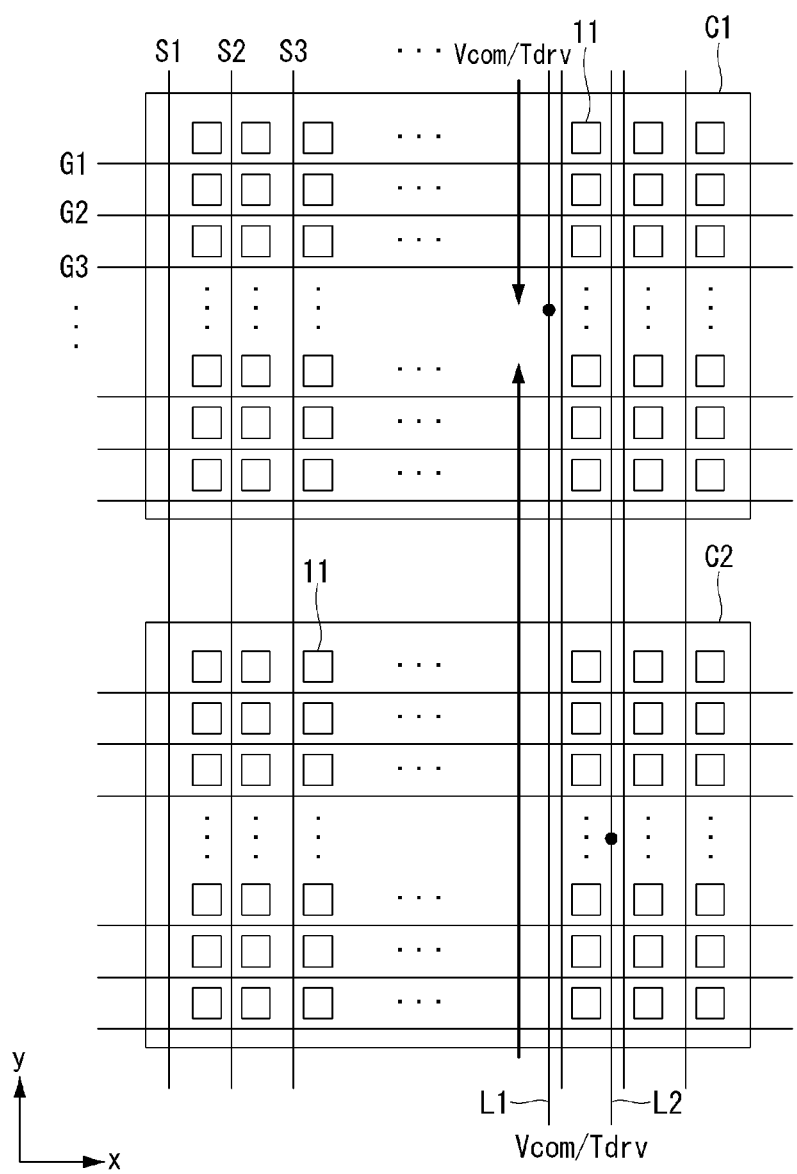

FIGS. 5 and 6 are views illustrating self capacitance type touch sensors according to one embodiment. In FIGS. 5 and 6, reference numeral '11' denotes pixel electrodes of the pixels, and reference numeral '101' denotes substrates of the display panel 100. Reference numeral '102' denotes a pixel array where an input image is displayed. The portion outside the pixel array 102 on the display panel 100 is a non-display region, i.e., a bezel.

Referring to FIGS. 5 and 6, the common electrode COM is divided into a plurality of sensors C1 to C4. The sensor lines L1 to L4 are connected to the sensors C1 to C4 of the touch sensors on a one-to-one basis. Thus, each sensor line is connected to a corresponding sensor. For example, sensor line L1 is connected to sensor C1 and sensor line L2 is connected to sensor C2 and so on. Each of the self-capacitance type touch sensors comprises capacitance connected to a sensor electrode.

Each of the sensors C1 to C4 is patterned to be larger in size than the size of a pixel and is connected to a plurality of pixels. Each of the sensors C1 to C4 may be formed of a transparent conductive material, for example, ITO (Indium Tin Oxide). The sensor lines L1 to L4 may be formed of a low-resistance metal, for example, copper (Cu), aluminum neodymium (AlNd), molybdenum (Mo), or titanium (Ti). The sensors C1 to C4 are common electrodes that are connected together to supply the common voltage Vcom to the pixels during the display driving period Td. The sensors C1 to C4 are isolated from each other during the touch sensor driving period Tt. Accordingly, the self capacitance type touch sensors are isolated from each other and independently driven during the touch sensor driving period Tt.

In one embodiment, the display device comprises a double feeding means for connecting the sensors C1 to C4 and supplying the common voltage Vcom to the sensors C1 to C4 during the display driving period Td. The double feeding means applies the common voltage at both ends of the sensor lines L1 to L4 to reduce delays of the common voltage applied to the sensors C1 to C4 and make the common voltage of the pixels uniform on the entire screen.

The double feeding means comprises a first feeding unit for applying the common voltage Vcom to one end of the sensor lines L1 to L4 during the display driving period Td and a second feeding unit for connecting the sensor lines L1 to L4 to each other through the feed line D1 and supplying the common voltage Vcom to the other end of the sensor lines L1 to L4 during the display driving period Td. The touch sensors are short-circuited since the sensor lines L1 to L4 are connected through the feed line D1 during the display driving period Td.

The first feeding unit supplies a touch driving signal to the touch sensors through the sensor lines L1 to L4 during the touch sensor driving period Tt. The second feeding unit isolates the sensor lines from each other and independently drives each of the touch sensors during the touch sensor driving period Tt.

The first feeding unit and the second feeding unit are located opposite to each other, with the sensor lines L1 to L4 interposed between them. The first feeding unit may be an IC connected to the lower end of the sensor lines L1 to L4 of FIG. 5, and the second feeding unit may be connected, but not limited, to the upper end of the sensor lines L1 to L4. For example, if the sensor lines L1 to L4 are formed along a transverse direction, the first feeding unit and the second feeding unit may be placed on the left and right of the display panel 100, with the sensor lines L1 to L4 interposed between them.

The second feeding unit comprises TFTs T1 where each TFT T1 is connected to a corresponding sensor line from sensor lines L1 to L4, and a feed line D1, and a feed control line D2 that are connected to the TFTs T1. The TFTs T1 have the same structure and size as the pixel TFTs T3 and are formed simultaneously with the pixel TFTs T3. The TFTs T1 each have a gate connected to the feed control line D2, a drain connected to the feed line D1, and a source connected to the sensor lines L1 to L4. Accordingly, the TFTs T1 selectively connect the feed line D1 and the sensor lines in response to the voltage of the feed control line D2.

The feed line D1 and the feed control line D2 are low-resistance metal lines that are formed along the bezel region outside the pixel array 102. The power supply unit 50 supplies the common voltage Vcom to the feed line D1 and the gate high voltage VGH through the feed control line D2 during the display driving period Td to turn on the TFTs T1. Accordingly, the TFTs T1 supply the common voltage Vcom from the feed line D1 to the sensor lines L1 to L4 in response to the gate high voltage VGH applied through the feed control line D2 during the display driving period Td.

Figure 7:
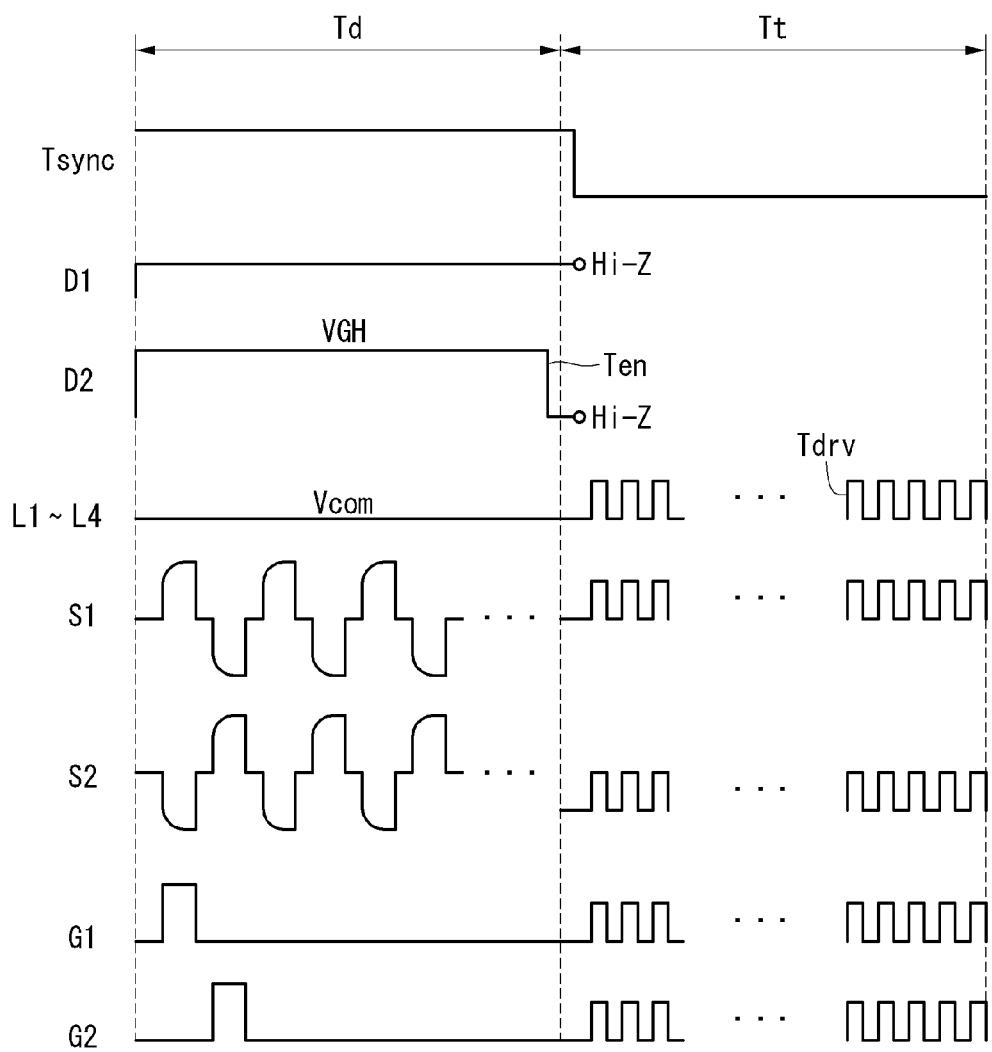
FIGS. 7 to 9 are waveform diagrams showing a pixel driving signal and a touch driving signal that are applied to the display device.
Figure 8:
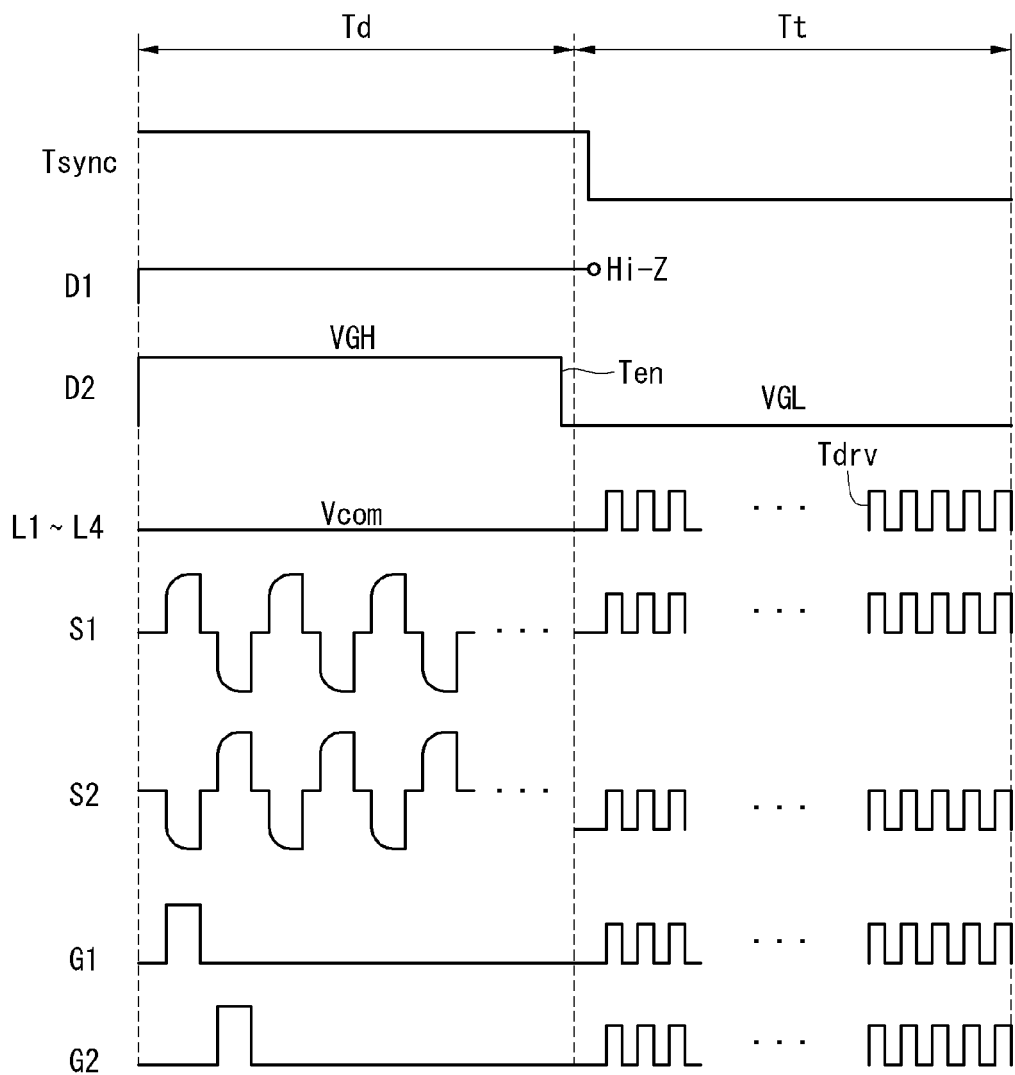
Figure 9:
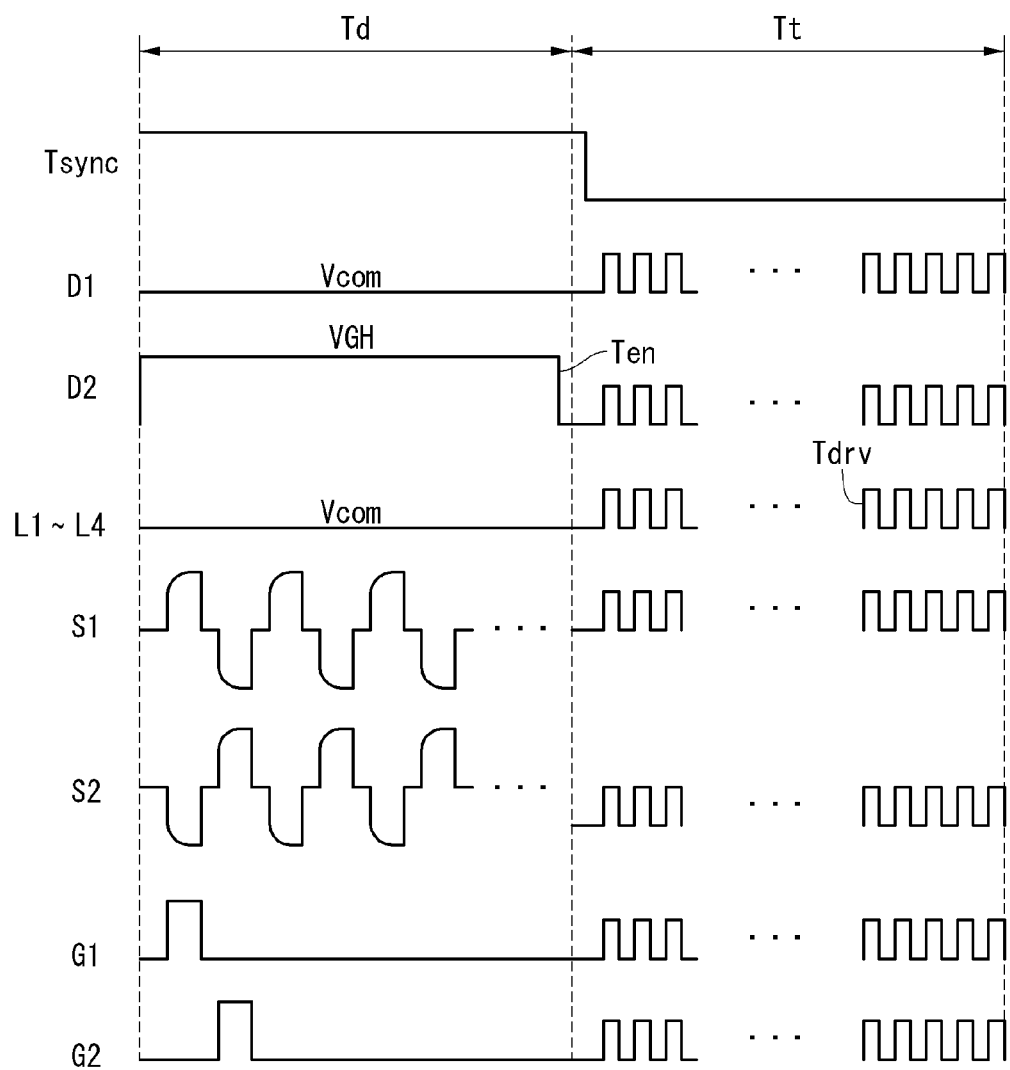

The TFTs T1 are maintained in the off state during the touch sensor driving period Tt. An AC signal having the same phase as the touch driving signal Tdrv may be applied to the gate and drain of the TFTs T1 in order to minimize the parasitic capacitance between the TFTs T1 and the sensor lines L1 to L4. During the touch sensor driving period Tt, the feed line D1 and the feed control line D2 can be controlled as shown in FIGS. 7 to 9. This will be described later in conjunction with FIGS. 7 to 9.

The feed line D1 and the feed control line D2 may be controlled to the power supply unit 50 through a flexible printed circuit (FPC).

FIGS. 7 to 9 are waveform diagrams showing a pixel driving signal and a touch driving signal that are applied to the display device. In FIGS. 7 to 9, 'Ten' denotes the voltage of the feed control line D2, and 'Vcom' denote the voltage of the feed line D1.

Referring to FIG. 7, the display driving period TD and the touch sensor driving period Tt are time-divided.

Input image data is written to the pixels during the display driving period Td. During the display driving period Td, the data voltage of an input image is supplied to the data lines S1 and S2, and a gate pulse synchronized with the data voltage is sequentially applied to the scan lines G1 and G2. The common voltage Vcom is supplied to the interconnected sensors C1 to C4 through both ends of the sensor lines L1 to L4 during the display driving period Td. During the display driving period TD, the gate high voltage VGH, which is higher than the threshold voltage of the TFTs T1, is supplied to the feed control line D2, and the common voltage Vcom is supplied to the feed line D1. Accordingly, the common voltage Vcom is supplied to both ends of the sensor lines L1 to L4 through the IC and the TFTs T1. When the common voltage Vcom is applied to the sensors C1 to C4 through the sensor lines L1 to L4, a voltage drop across the sensors C1 to C4 can be prevented. This makes uniform the common voltage Vcom applied to the pixels on a large screen, thus improving picture quality.

The data voltage charged in the pixels is maintained during the touch sensor driving period Tt. This is because the pixel TFTs T3 and the TFTs T1 of the second feeding unit are maintained in the off state during the touch sensor driving period Tt.

The power supply unit 50 may generate a voltage of the touch driving signal Tdrv supplied to the sensors C1 to C4 during the touch sensor driving period Tt. Output terminals of the power supply unit 50 are disconnected from the feed line D1 and the feed control line D2 during the touch sensor driving period Tt. Accordingly, the feed line D1 and the feed control line D2 may be maintained in a high impedance (Hi-Z) state where no voltage is applied, during the touch sensor driving period Tt. The TFTs Ti are maintained in the off state during the touch sensor driving period Tt because the feed line D1 and the feed control line D2 are maintained at high impedance (Hi-Z).

The power supply unit 50 generates an AC signal having the same phase as the touch driving signal Tdrv during the touch sensor driving period Tt in order to minimize the parasitic capacitance between the sensor lines L1 to L4 and the signal lines S1, S2, G1, and G2 connected to the pixels. To minimize the parasitic capacitance, the voltage of the AC signal can be set to be equal to the voltage of the touch driving signal Tdrv.

Referring to FIG. 8, the method of driving the pixels and the touch sensors during the display driving period Td is substantially identical to that of the exemplary embodiment of FIG. 7, a detailed description thereof will be omitted.

The data voltage charged in the pixels is maintained during the touch sensor driving period Tt. This is because the pixel TFTs T3 and the TFTs T1 of the second feeding unit are maintained in the off state during the touch sensor driving period Tt. The feed line D1 is maintained in a high impedance state during the touch sensor driving period Tt. The feed control line D2 is maintained at the gate low voltage VGL, which is lower than the threshold voltage of the TFTs T1, during the touch sensor driving period Tt.

The power supply unit 50 generates a voltage of the touch driving signal Tdrv supplied to the sensors C1 to C4 during the touch sensor driving period Tt. The power supply unit 50 generates an AC signal having the same phase as the touch driving signal Tdrv during the touch sensor driving period Tt in order to minimize the parasitic capacitance between the sensor lines L1 to L4 and the signal lines S1, S2, G1, and G2 connected to the pixels. To minimize the parasitic capacitance, the voltage of the AC signal can be set to be equal to the voltage of the touch driving signal Tdrv.

Referring to FIG. 9, the method of driving the pixels and the touch sensors during the display driving period Td is substantially identical to that of the exemplary embodiment of FIG. 7, a detailed description thereof will be omitted.

The data voltage charged in the pixels is maintained during the touch sensor driving period Tt. This is because the pixel TFTs T3 and the TFTs T1 of the second feeding unit are maintained in the off state during the touch sensor driving period Tt.

The voltages of the AC signal and touch driving signal Tdrv applied to the pixel signal lines S1 and S2 and G1 and G2 and the sensor lines L1 to L4 during the touch sensor driving period Tt should be lower than the gate high voltage VGH and the threshold voltage of the pixel TFTs T3 so as to avoid changes in the data written to the pixels.

The power supply unit 50 generates a voltage of the touch driving signal Tdrv supplied to the sensors C1 to C4 during the touch sensor driving period Tt. The power supply unit 50 generates an AC signal having the same phase as the touch driving signal Tdrv during the touch sensor driving period Tt in order to minimize the parasitic capacitance between the sensor lines L1 to L4 and the signal lines S1, S2, G1, and G2 connected to the pixels, the parasitic capacitance between the sensor lines L1 to L4 and the feed line D1, and the parasitic capacitance between the sensor lines L1 to L4 and the feed control line D2. To minimize the parasitic capacitance, the voltage of the AC signal can be set to be equal to the voltage of the touch driving signal Tdrv. Such an AC signal is supplied to the sensor lines L1 to L4, the signal lines S1, S2, G1, and G2 connected to the pixels, the feed line D1, and the feed control line D2 during the touch sensor driving period Tt. The voltage of the touch driving signal Tdrv and the voltage of the AC signal having the same phase as the touch driving signal Tdrv are lower than the threshold voltage of the TFTs T1. Accordingly, the TFTs T1 are maintained in the off state during the touch sensor driving period Tt.

Figure 10:
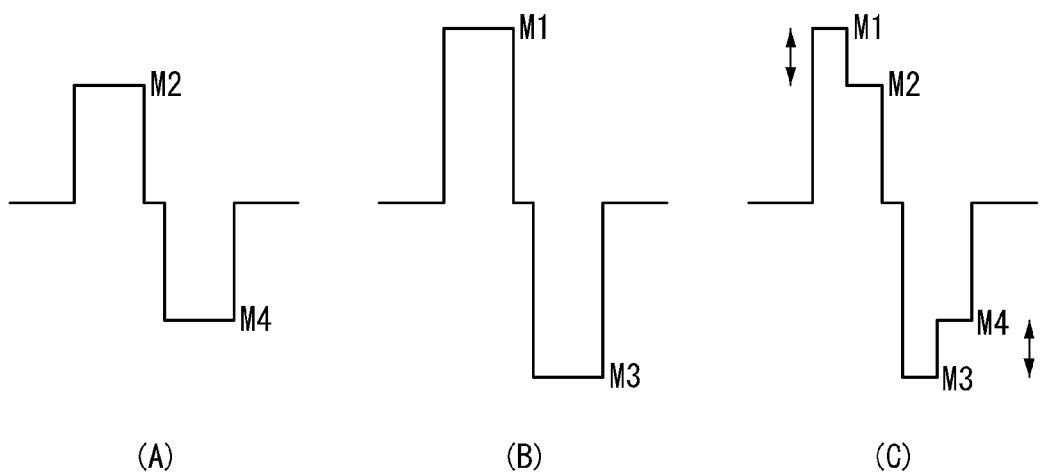
FIG. 10 is a waveform diagram showing various examples of the touch driving signal.

FIG. 10 is a waveform diagram showing various examples of the touch driving signal Tdrv.

The touch driving signal Tdrv may have various waveforms and voltages depending on the size, resolution, and RC delay of the display panel into consideration. For example, if the RC delay is long, the voltage of the touch driving signal Tdrv is preferably set to be higher, taking a voltage drop into account. In FIG. 10, M1 to M3 (M1>M2>M3>M4) are the voltage of the touch driving signal Tdrv. The touch driving signal Tdrv may have a multi-step waveform as shown in FIG. 10C. M1 is the potential for charging the touch sensors within a short period of time, and M3 is the potential for quickly clearing the residual charge from the touch sensors. The touch driving signal Tdrv shown in FIG. 10C may have the multi-step waveform suggested in U.S. patent application Ser. No. 14/079,798 which is incorporated by reference. The touch driving signal Tdrv shown in FIG. 10C has a high potential of M1 and steps down to an intermediate potential M2 that is less than M1. The touch driving signal then transitions to the low potential M3 that is less than the potential M2. The touch driving signal Tdrv then transitions to an intermediate potential M4 that is greater than potential M3 but less than intermediate potential M3. The AC signal having the same phase as the touch driving signal Tdrv also may have various waveforms as shown in FIG. 10. For example, FIG. 10A illustrates the touch driving signal Tdrv having a multi-step waveform with a high potential of M2 and a low potential of M4. The touch driving signal Tdrv transitions from the intermediate potential M2 to the intermediate potential M4. In the embodiment of FIG. 10A, potential M2 is the high potential of the touch driving signal Tdrv and potential M4 is the low potential of the touch driving signal Tdrv. In other word, the touch driving signal as shown in FIG. 10A is a multi-step waveform that transitions from a first level to a second level that is greater than the first level, and subsequently from the second level to the first level, and subsequently from the first level to a third level that is less than the first level, and subsequently from the third level to the first level. FIG. 10B illustrates the touch driving signal Tdrv having a multi-step waveform with a high potential of M1 and a low potential of M3. The touch driving signal as shown in FIG. 10C is a multi-step waveform that transitions from a first level to a second level that is greater than the first level, and subsequently from the second level to the third level that is less than the second level and greater than the first level, and subsequently from the third level to the first level, and subsequently from the first level to a fourth level that is less than the first level, and subsequently from the fourth level to a fifth level that is greater than the fourth level and less than the first level, and subsequently from the fifth level to the first level. The touch driving signal Tdrv transitions from the high potential M1 to the low potential M3. The AC signal may have the same phase, same voltage, and same waveform as the touch driving signal Tdrv, as shown in FIGS. 7 to 9 and FIGS. 12 and 13.

FIG. 11 is a circuit diagram showing in detail a driving circuit of a display device according to one embodiment. FIGS. 12 and 13 are waveform diagrams showing a pixel driving signal and a touch driving signal that are output from the driving circuit of FIG. 11.

Referring to FIGS. 11 to 13, the power supply unit 50 generates common voltages Vcom1 and Vcom2, a logic power supply voltage Vcc, gate high voltages VGH1 and VGH2, gate low voltages VGL1 and VGL2, AC signal voltages M1 to M4, etc. The logic power supply voltage Vcc is the driving voltage of the gate driving circuit 14 and the IC.

The first common voltage Vcom1 is applied to one end of the sensor lines L1 to L4 through a first upper feeding unit 31 and a first lower feeding unit 32 within the IC. The second common voltage Vcom2 is applied to the other end of the sensor lines L1 to L4 through a second feeding unit D1, D2, and T1. If the load connected to the second feeding unit D1, D2, and T1 is larger than the load connected to the first upper feeding unit 31 and the first lower feeding unit 32, the second common voltage Vcom2 is preferably set to be higher than the first common voltage Vcom1. If the load difference is small, the first and second common voltages Vcom1 and Vcom2 can be set equal in potential.

The first gate high voltage VGH1 and the first gate low voltage VGL1 are supplied to the gate lines G1 and G2 through the gate driving circuit 14. A kickback voltage may be generated due to the parasitic capacitance Clc between the liquid crystal cell and the pixel TFT T3, thus causing flicker. By decreasing the first gate high voltage VGH1 at the falling edge of a gate pulse, the kickback voltage can be reduced and therefore flicker can be reduced. As shown in FIGS. 12 and 13, the first gate high voltage VGH1 transitions to a predetermined modulation voltage Vm before transitioning to the first gate low voltage VGL1.

The gate driving circuit 14 supplies a gate pulse swinging between the first gate high voltage VGH1 and the first gate low voltage VGL1 to the gate lines G1 and G2 during the display driving period Td. The gate driving circuit 14 supplies an AC signal to the gate lines G1 and G2 in synchronization with the touch driving signal Tdrv during the touch sensor driving period Tt. The AC signals have the same phase as the touch driving signal Tdrv and are synchronized with it.

The gate driving circuit 14 sequentially shifts the output of a shift register. The shift register outputs the gate pulse in response to the gate start pulse GSP and the gate shift clock GSC, and shifts the output. An AC signal output from the power supply unit 50, a gate shift clock GSC, input into the shift register.

The second gate high voltage VGH2 and the second gate low voltage VGL2 are supplied to the feed control line D2. If the load connected to the second feeding unit D1, D2, and T1 is larger than the load connected to the gate driving circuit 14, the second gate high voltage VGH2 is set higher than the first gate high voltage VGH1. If the load connected to the second feeding unit D1, D2, and T1 is larger than the load connected to the gate driving circuit 14, the second gate low voltage VGL2 is set lower than the first gate low voltage VGL1. If the load difference is small, the first and second gate high voltages VGH1 and VGH2 can be set equal in potential and the first and second gate low voltages VGL1 and VGL2 likewise can be set equal in potential.

The power supply unit 50 may be divided into a first power supply unit 50A and a second power supply unit 50B. The first power supply unit 50A supplies a voltage required to drive the IC and the gate driving circuit 14. The second power supply unit 50B supplies a voltage required to drive the second feeding unit 62.

The first power supply unit 50A comprises a plurality of multiplexers 51, 52, 53, and 54. The first multiplexer 51 selects the first gate low voltage VGL1 and the AC signal voltages M1 to M4 output from the second multiplexer 52 in response to a first selection signal and supplies them to the gate driving circuit 14. The second multiplexer 52 selects and outputs the AC signal voltages M1 to M4 in accordance with a predetermined AC signal waveform in response to a second selection signal. The first gate high voltage VGH1 is supplied directly to the gate driving circuit 14.

The third multiplexer 53 supplies the AC signal voltages M1 to M4 to the second multiplexer 32 of the first upper feeding unit 31 and the first lower feeding unit 32 during the touch sensor driving period Tt in response to a third selection signal. The fourth multiplexer 54 supplies the AC signal voltages M1 to M4 to multiplexers 13 connected to the data lines S1 and S2 during the touch sensor driving period Tt in response to a fourth selection signal.

The IC comprises the data driving circuit 12, the sensing circuit 30, the first upper feeding unit 31 and the first lower feeding unit 32, and the multiplexers 13.

A first multiplexer 31 of the first upper feeding unit 31 and the first lower feeding unit 32 comprises an output terminal connected to the sensor lines L1 to L4 and an input terminal connected to a second multiplexer 32 and the sensing circuit 30. The first multiplexer 31 supplies the first common voltage Vcom1 input through the second multiplexer 32 to the sensor lines L1 to L4 during the display driving period Td in response to a fifth selection signal. The first multiplexer 31 supplies the AC signal voltages M1 to M4 input through the second multiplexer 32 to the sensor lines L1 to L4 during the touch sensor driving period Tt, and connects the sensor lines L1 to L4 to the sensing circuit 30. The sensing circuit 30 sense changes in capacitance based on the count of signal variations across the sensor lines L1 to L4 during the touch sensor driving period Tt.

The second multiplexer 32 comprises an output terminal connected to the first multiplexer and an input terminal connected to the first power supply unit 50A. The second multiplexer 32 supplies the first common voltage Vcom1 to the first multiplexer 31 during the display driving period d in response to a sixth selection signal, and then supplies the AC signal voltages M1 to M4 to the first multiplexer 31 during the touch sensor driving period Tt.

The multiplexers 13 each comprise an output terminal connected to the data lines S1 and S2 and an input terminal connected to the data driving circuit 12 and the first power supply unit 50A. The multiplexers 13 supply the data voltage of an input image to the data lines S1 and S2 during the display driving period Td in response to a seventh selection signal, and then supply the AC signal voltages M1 to M4 to the data lines S1 and S2 during the touch sensor driving period Tt.

The second power supply unit 50B comprises first to fourth multiplexers 55, 56, 57, and 58.

The first multiplexer 55 comprises an output terminal connected to the feed control line D2 and an input terminal connected to the second multiplexer 57. The first multiplexer 55 supplies the second gate high voltage VGH2 to the feed control line D2 during the display driving period Td in response to an eighth selection signal. In order to implement the driving method of FIGS. 7 to 9, the first multiplexer 55 connects either a high impedance terminal Hi-Z or the output terminal of the second multiplexer 57 to the feed control line D2 during the touch sensor driving period Tt in response to the eighth selection signal, or supplies the second gate low voltage VGL2 to the feed control line D2.

The second multiplexer 57 comprises an output terminal connected to the first multiplexer 55 and an input terminal for supplying the AC signal voltages M1 to M4. The second multiplexer 57 supplies the AC signal voltages M1 to M4 during the touch sensor driving period Tt in response to a ninth selection signal.

The third multiplexer 56 comprises an output terminal connected to the feed line D1 and an input terminal connected to the fourth multiplexer 58. The third multiplexer 56 supplies the second common voltage Vcom2 to the feed line D1 during the display driving period Td in response to a tenth selection signal. In order to implement the driving method of FIGS. 7 to 9, the third multiplexer 56 connects either a high impedance terminal Hi-Z or the output terminal of the fourth multiplexer 58 to the feed control line D2 during the touch sensor driving period Tt in response to the tenth selection signal, The fourth multiplexer 58 comprises an output terminal connected to the fourth multiplexer 56 and an input terminal for supplying the AC signal voltages M1 to M4. The fourth multiplexer 57 supplies the AC signal voltages M1 to M4 during the touch sensor driving period Tt in response to an eleventh selection signal.

A MCU (Micro Controller Unit) of the timing controller 20 or sensing circuit 30 can generate selection signals for controlling the multiplexers 51 to 58, 13, 31, and 32.

Figure 14:
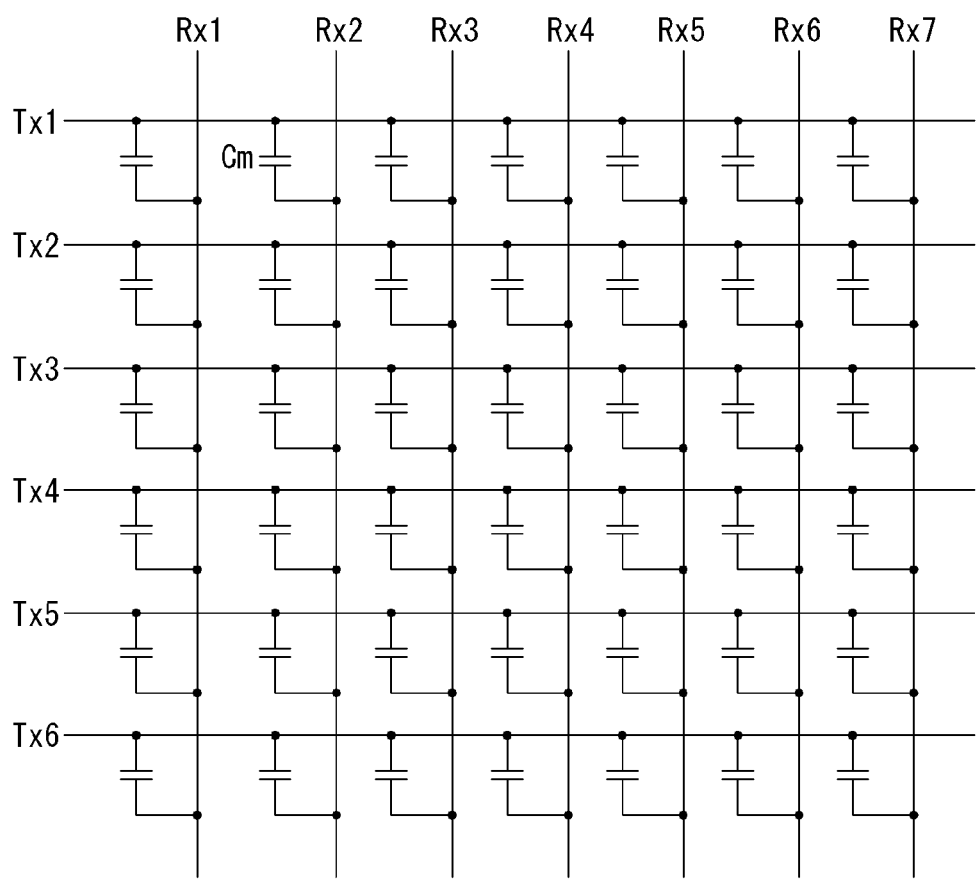
FIG. 14 is an equivalent circuit diagram showing mutual capacitance type touch sensors according to one embodiment.
Figure 15:
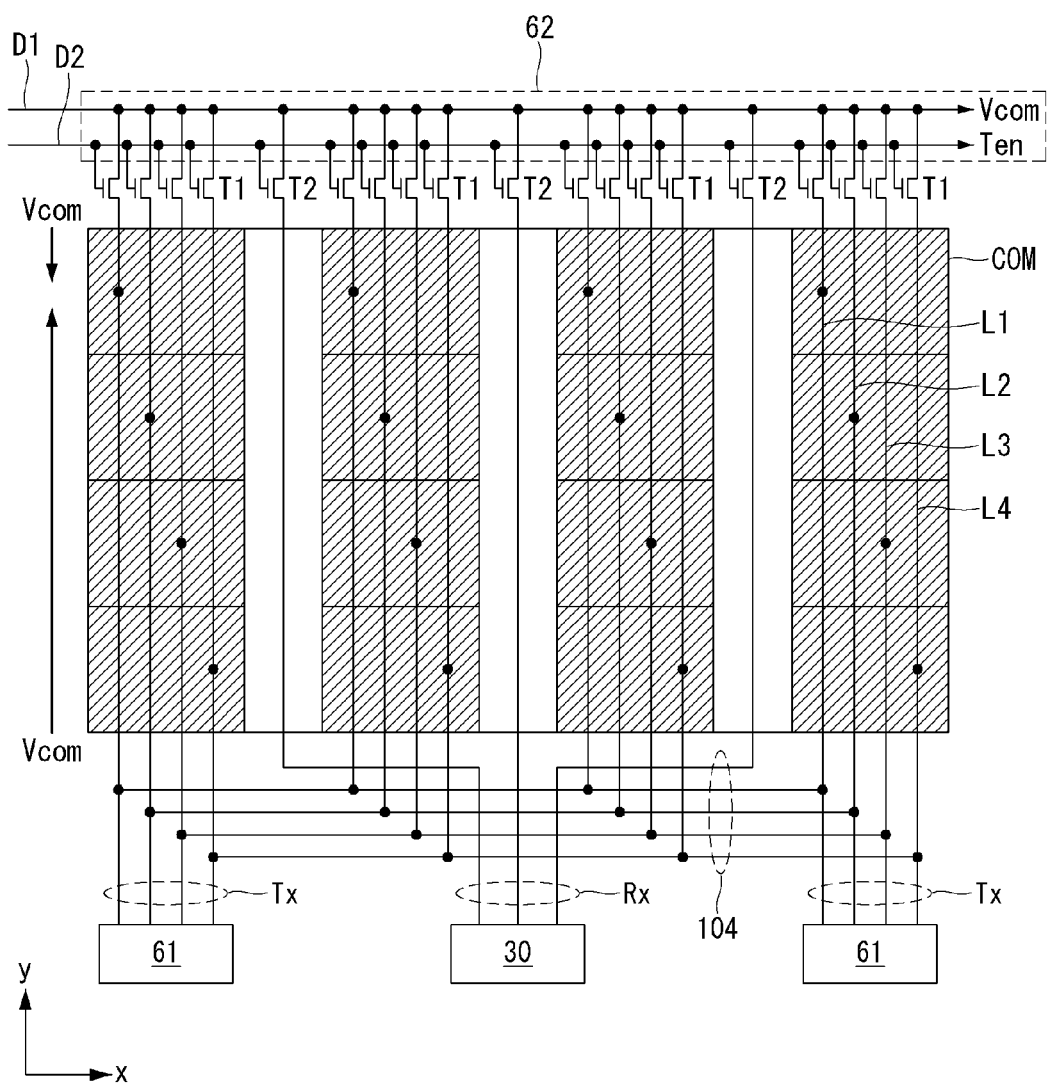
FIGS. 15 to 17 are views showing examples of connecting a double feeding means to the touch sensors of FIG. 14.
Figure 16:
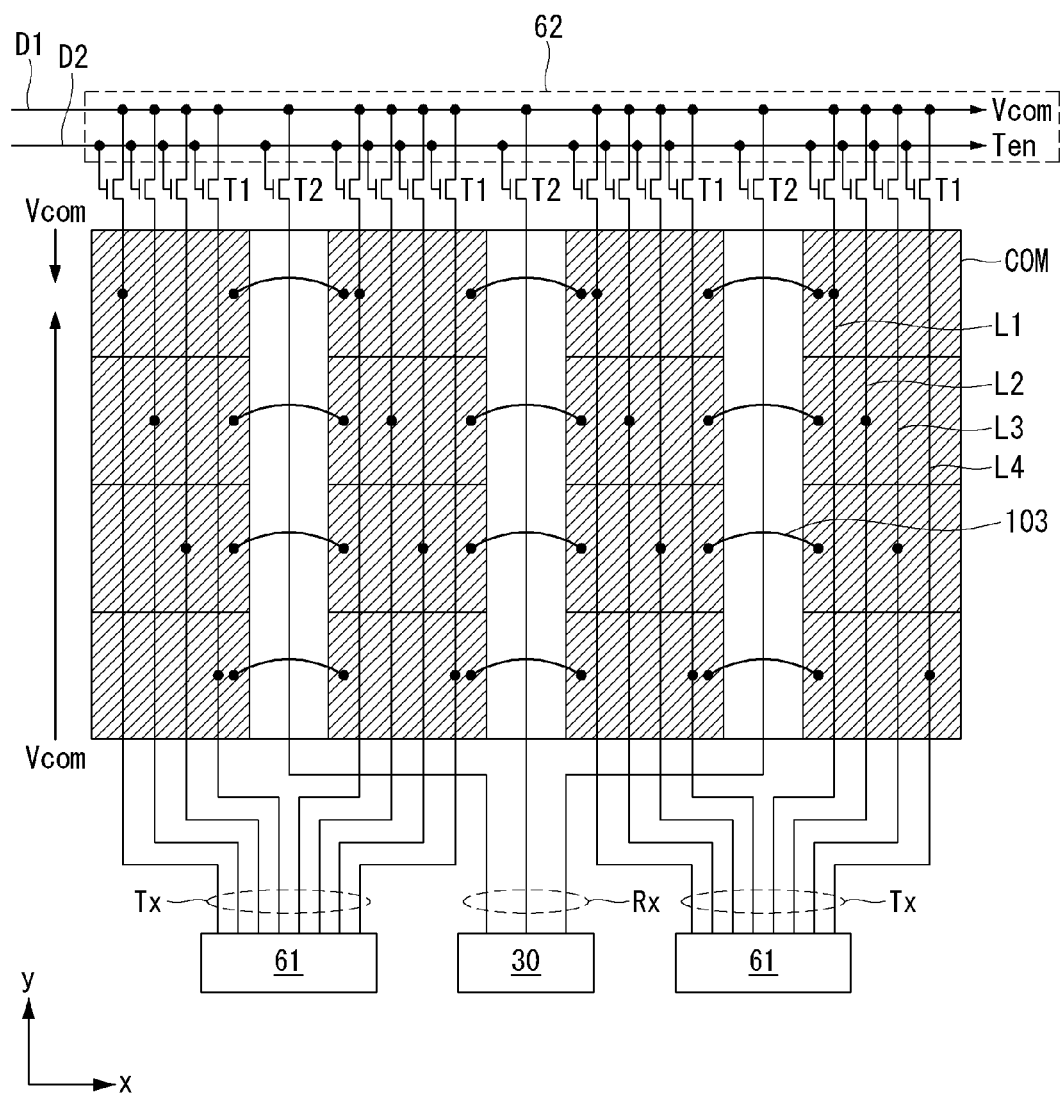
Figure 17:
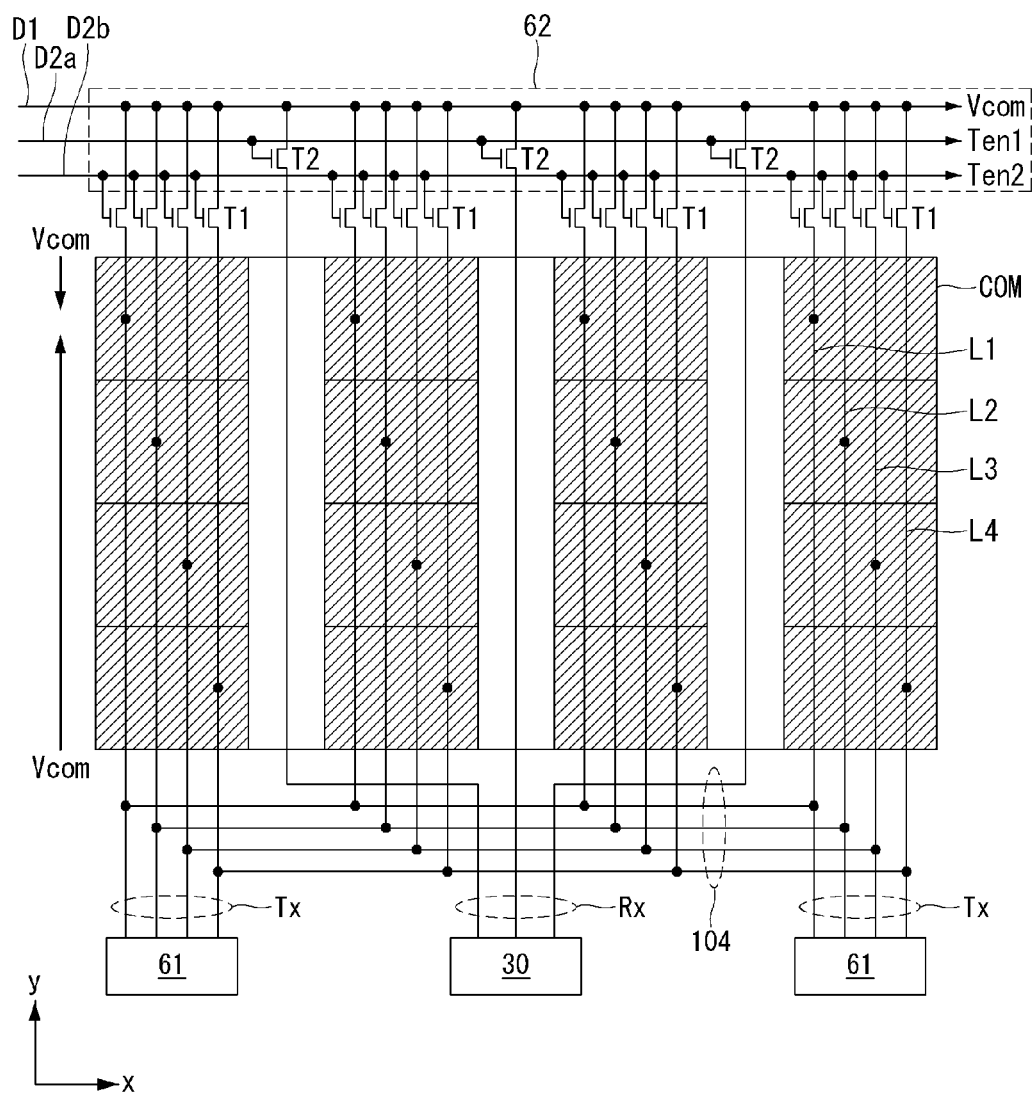

FIG. 14 is an equivalent circuit diagram showing mutual capacitance type touch sensors according to one embodiment. FIGS. 15 to 17 are views showing examples of connecting a double feeding means to the touch sensors of FIG. 14.

Referring to FIGS. 14 to 17, the mutual capacitance Cm of the touch sensors occurs between Tx lines Tx1 to Tx6 and Rx lines Rx1 to R7. The Tx lines Tx1 to Tx6 are orthogonal to the Rx lines Rx1 to R7.

The Tx lines Tx1 to Tx6 and the Rx lines Rx1 to R7 are divided up from the common electrode COM for supplying the common voltage Vcom. Each of the Tx lines Tx1 to Tx6 is formed by connecting neighboring sensors along the transverse direction (x-axis). The Rx lines Rx1 to R7 are longitudinally formed along the longitudinal direction (y-axis) so as to be orthogonal to the Tx lines Tx1 to Tx6. The sensors of Tx lines neighboring along the transverse direction may be connected through routing lines 104 formed in the bezel region outside the pixel array 102 as shown in FIGS. 15 and 17, or connected in a bridge pattern 103 within the pixel array 102 as shown in FIG. 16. In the bridge pattern 103, the sensor of the Tx lines, separated from each other with the Rx lines Rx1 to R7, are connected via an insulation layer.

During the touch sensor driving period Tt, an AC signal having the same phase as the touch driving signal Tdrv is applied to the signal lines S1, S2, G1, and G2 connected to the pixels and the Rx lines, thereby minimizing the parasitic capacitance of the touch sensors. Likewise, during the touch sensor driving period Tt, an AC signal having the same phase as the touch driving signal Tdrv may be applied to the feed line D1 and the feed control line D2.

Figure 18:
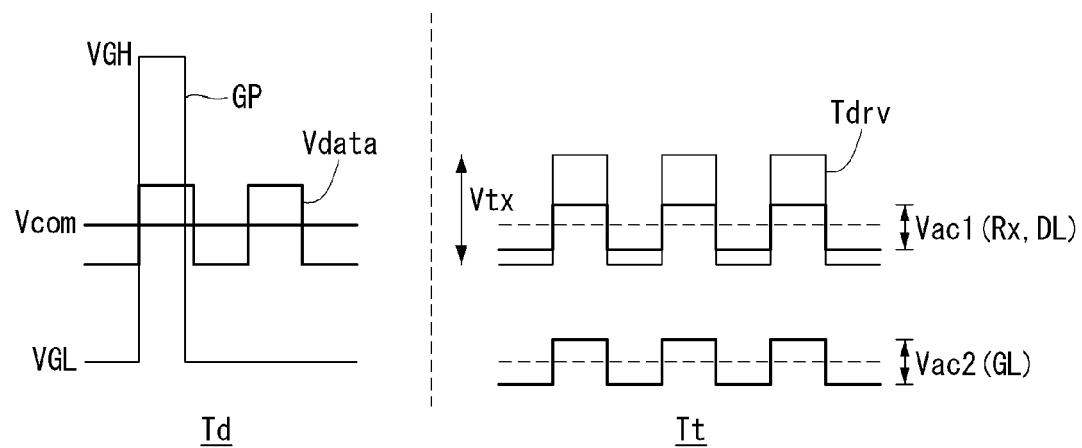
FIG. 18 is a waveform diagram showing the waveforms of signals applied to the mutual capacitance type touch sensors.

Since a potential difference must exist between the Tx lines and the Rx lines in order to electrically charge the mutual capacitance CM, the AC signal applied to the Rx lines should have the same phase as the touch driving signal Tdrv and a lower voltage than it. Accordingly, the voltage Vtx of the touch driving signal Tdrv should be higher than the voltages Vac1 and Vac2 of the AC signal applied to the pixel signal lines DL and GL and the RX lines, as shown in FIG. 18.

The voltages Vac1 and Vac2 of the AC signal applied to the pixel signal lines S1 and S2 and G1 and G2, the sensor lines L1 to L4, and the Rx lines during the touch sensor driving period Tt and the voltage Vtx of the touch driving signal Tdrv should be lower than the gate high voltage VGH and the threshold voltage of the pixel TFTs T3 so as to avoid changes in the data written to the pixels.

The double feeding means supplies the common voltage Vcom to both ends of the Tx lines Tx1 to Tx6 and Rx lines Rx1 to R7 during the display driving period Td, and then supplies the touch driving signal Tdrv to the Tx lines Tx1 to Tx6 during the touch sensor driving period Tt. The sensing circuit 30 measures a change in the amount of electric charge received through the Rx lines Rx1 to Rx7 in synchronization with the touch driving signal Tdrv, compares the change in the amount of electric charge with a predetermined threshold value, detects touch input if the change in the amount of electric charge is larger than the threshold value, and calculates the coordinates.

The power supply unit 50 generates a voltage required for the feed line D1 and the feed control line D2 for double-feeding of the common voltage Vcom. The power supply unit 50 generates voltages such as the gate high voltage VGH, the gate low voltage VGL, a gamma reference voltage, and the logic power supply voltage Vcc. Analog positive/negative gamma compensation voltages are divided from the gamma reference voltage. The power supply unit 50 generates an AC signal having the same phase as the touch driving signal Tdrv during the touch sensor driving period Tt.

The double feeding means comprises a first feeding unit for applying the common voltage Vcom to one end of the sensor lines L1 to L4 and a second feeding unit 62 for connecting the sensor lines L1 to L4 to each other through the feed line D1 and supplying the common voltage Vcom to the other end of the sensor lines L1 to L4. The sensor lines L1 to L4 are short-circuited since the sensor lines L1 to L4 are connected through the feed line D1 during the display driving period Td.

The first feeding unit 61 supplies the touch driving signal Tdrv to the Tx lines through the sensor lines L1 to L4 during the touch sensor driving period Tt. The second feeding unit 62 isolates the sensor lines from each other to disconnect the Tx lines and the Rx lines during the touch sensor driving period Tt.

The first feeding unit 61 and the second feeding unit 62 are located opposite to each other, with the sensor lines L1 to L4 interposed between them. The sensor lines L1 to L4 are connected to the sensors of the Tx lines. The second feeding unit 62 comprises first TFTs T1 respectively connected to the sensor lines L1 to L4, second TFTs T2 connected to the Rx lines, and a feed line D1 and a feed control line D2, D2a, and D2b that are connected to the TFTs T1 and T2.

The TFTs T1 and T2 have the same structure and size as the pixel TFTs T3 and are formed simultaneously with the pixel TFTs T3. The first TFTs T1 each have a gate connected to the feed control line D2 and D2a, a drain connected to the feed line D1, and a source connected to the sensor lines. Accordingly, the first TFTs T1 selectively connect the feed line D1 and the sensor lines in response to the voltage of the feed control line D2b.

The second TFTs T2 each have a gate connected to the feed control line D2a, a drain connected to the feed line D1, and a source connected to the Rx lines. Accordingly, the second TFTs T2 selectively connect the feed line D1 and the Rx lines in response to the voltage of the feed control line D2a. As shown in FIG. 17, the first TFTs T1 and the second TFTs T2 may be controlled individually to vary the feeding time and the feeding voltage, taking into consideration the difference between the load connected to the Tx lines and the load connected to the Rx lines.

The TFTs T1 and T2 are maintained in the off state during the touch sensor driving period Tt. An AC signal having the same phase as the touch driving signal Tdrv may be applied to the gates and drains of the TFTs T1 and T2 through the feed line D1 and the feed control line D2, D2a, and D2b in order to minimize the parasitic capacitance between the TFTs T1 and T2 and the sensor lines L1 to L4.

As described above, the present invention uses the in-cell touch sensor technology for a display device to divide a common electrode for supplying a common voltage to pixels into sensors for a plurality of touch sensors and supply the common voltage and a touch drive signal to the touch sensors through sensor lines connected to the sensors. The embodiments herein allow for connecting the sensor lines during the display driving period, supplying the common voltage to both ends of the sensor lines once the touch sensors are short-circuited, and isolating the sensor lines during a touch sensor driving period. As a result, the touch sensing device makes uniform the common voltage applied to the pixels in the display device comprising in-cell touch sensors.

According to the embodiments herein, an AC signal having the same phase as a touch driving signal can be applied to the signal lines connected to the pixels during the touch sensor driving period in order to minimize the parasitic capacitance attached to the touch sensors. Accordingly, the touch sensing device of the present invention can minimize the parasitic capacitance of the touch sensors.

The display device can achieve a larger screen with in-cell touch sensors and a higher touch screen resolution by making uniform the common voltage of the pixels connected to the in-cell touch sensors and minimizing the parasitic capacitance of the touch sensors.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch sensing device comprising:
   signal lines connected to pixels of the touch sensing device;
   a plurality of sensor lines connected to touch sensors of the touch sensing device, each sensor line including a first end and a second end, and the plurality of sensor lines extending in a same direction from the first end of each of the plurality of sensor lines to the second end of each of the plurality of sensor lines;
   a first feeding unit that supplies a common voltage to the first end of each of the plurality of sensor lines during a display driving period and supplies a touch driving signal to the first end of each of the plurality of sensor lines during a touch sensor driving period; and
   a second feeding unit that supplies the common voltage to the second end of each of the plurality of sensor lines during the display driving period while the first feeding unit supplies the common voltage to the first end of each of the plurality of sensor lines during the display driving period to connect together the touch sensors,
   wherein the second feeding unit isolates the plurality of sensor lines during the touch sensor driving period.

2. The touch sensing device of claim 1, wherein the second feeding unit comprises thin film transistors (TFTs) each having a source connected to one of the plurality of sensor lines, a drain connected to a feed line, and a gate connected to a feed control line,
   wherein a gate high voltage that is higher than a threshold voltage of the TFTs is supplied to the feed control line and the common voltage is supplied to the feed line during the display driving period, and the TFTs are turned on in response to the gate high voltage during the display driving period to connect the sensor lines to the feed line.

3. The touch sensing device of claim 2, wherein the feed control line and the feed line are in a high impedance state during the touch sensor driving period.

4. The touch sensing device of claim 2, wherein a gate low voltage that is lower than the threshold voltage of the TFTs is supplied to the feed control line during the touch sensor driving period, and the feed line is in a high impedance state during the touch sensor driving period.

5. The touch sensing device of claim 2, wherein an alternative current (AC) signal having a same phase as the touch driving signal is supplied to the feed control line and the feed line during the touch sensor driving period.

6. The touch sensing device of claim 5, wherein a data voltage for writing data of an input image to the pixels and a gate pulse are supplied to the signal lines during the display driving period, and the AC signal having the same phase as the touch driving signal is supplied to the signal lines during the touch sensor driving period.

7. The touch sensing device of claim 6, wherein the touch sensors are self-capacitance type touch sensors, and the voltage of the AC signal is equal to the voltage of the touch driving signal.

8. The touch sensing device of claim 7, wherein each of the pixels comprises a pixel TFT, and the voltage of the touch driving signal and the voltage of the AC signal are lower than a threshold voltage of the pixel TFT.

9. The touch sensing device of claim 6, wherein the touch sensors are mutual capacitance type touch sensors each comprising transmission (Tx) lines, receiving (Rx) lines crossing the Tx lines, and mutual capacitance that occurs between the Tx lines and the Rx lines, and wherein the AC signal having the same phase as the touch driving signal is supplied to the Rx lines during the touch sensor driving period.

10. The touch sensing device of claim 9, wherein the voltage of the touch driving signal is higher than the AC signal supplied to the signal lines and the Rx lines.

11. A driving method of a touch sensing device comprising signal lines connected to pixels and a plurality of sensor lines connected to touch sensors, each sensor line including a first end and a second end, and the plurality of sensor lines extending in a same direction from the first end of each of the plurality of sensor lines to the second end of each of the plurality of sensor lines, the method comprising:
  supplying a common voltage to the first end and the second end of each of the plurality of sensor lines during a display driving period to connect together the plurality of sensor lines; and
  isolating the plurality of sensor lines and supplying a touch driving signal to the first end of each of the plurality of sensor lines during a touch sensor driving period.

12. A touch sensing device comprising:
  a plurality of touch sensors formed in a column, the plurality of touch sensors including a first touch sensor and a second touch sensor formed below the first touch sensor in the column;
  a first sensor line coupled to the first touch sensor, the first sensor line having a first length and including a first end and a second end;
  a second sensor line coupled to the second touch sensor, the second sensor line having a second length substantially same as the first length of the first sensor line and the second sensor line including a first end and a second end;
  a first component configured to supply a reference signal to both the first end of the first sensor line and the first end of the second sensor line during a display driving period; and
  a second component coupled to both the second end of the first sensor line and the second end of the second sensor line, the second component configured to supply the reference signal to both the second end of the first sensor line and to the second end of the second sensor line during the display driving period;
  wherein the first sensor line and the second sensor line extend in a same direction from the first end of each of the first sensor line and the second sensor line to the second end of each of the first sensor line and the second sensor line.

13. The touch sensing device of claim 12,
  wherein the first sensor line includes a first portion and a second portion, the first portion of the first sensor line comprising a connection point to the first touch sensor and the first end of the first sensor line that is coupled to the first component, and the second portion comprising the connection point to the first touch sensor and the second end of the first sensor line that is coupled to the second component; and
  wherein the second sensor line includes a first portion and a second portion, the first portion of the second sensor line comprising a connection point to the second touch sensor and the first end of the second sensor line that is coupled to the first component, and the second portion comprising the connection point to the second touch sensor and the second end of the second sensor line coupled to the second component;
  wherein the first portion of the first sensor line is longer than the first portion of the second sensor line and the second portion of the first sensor line is shorter than the second portion of the second sensor line.

14. The touch sensing device of claim 12, wherein the first component is further configured to supply a touch driving signal to both the first end of the first sensor line and the first end of the second sensor line during a touch sensor driving period.

15. The touch sensing device of claim 14, wherein the second component is further configured to isolate the first sensor line and the second sensor line from each other during the touch sensor driving period.

16. The touch sensing device of claim 14, wherein the touch driving signal is a multi-step waveform that transitions from a first level to a second level that is greater than the first level, and subsequently from the second level to the first level, and subsequently from the first level to a third level that is less than the first level, and subsequently from the third level to the first level.

17. The touch sensing drive of claim 14, wherein the touch driving signal is a multi-step waveform that transitions from a first level to a second level that is greater than the first level, and subsequently from the second level to the third level that is less than the second level and greater than the first level, and subsequently from the third level to the first level, and subsequently from the first level to a fourth level that is less than the first level, and subsequently from the fourth level to a fifth level that is greater than the fourth level and less than the first level, and subsequently from the fifth level to the first level.

18. The touch sensing device of claim 14, further comprising:
  a plurality of pixels;
  a plurality of gate lines coupled to the plurality of pixels, the plurality of gate lines receiving an alternating current (AC) signal that is in phase with the touch driving signal during the touch sensor driving period; and
  a plurality of data lines coupled to the plurality of pixels, the plurality of data lines also receiving the AC signal that is in the same phase with the touch driving signal during the touch sensor driving period.

19. The touch sensing device of claim 14, wherein the second component includes:

a first thin film transistor (TFT) comprising a source connected to the first sensor line, a gate connected to a feed control line, and a drain connected to a feed line;

a second TFT comprising a source connected to the second sensor line, a gate connected to the feed control line, and a drain connected to the feed line;

wherein the reference signal is supplied to the feed line during the display driving period; and wherein the first TFT provides the reference signal on the feed line to the first sensor line and the second TFT provides the reference signal on the feed line to the second sensor line responsive to the feed control line supplying a voltage that is greater than a threshold voltage of the first TFT and the second TFT to the gate of the first TFT and the gate of the second TFT.

20. The touch sensing device of claim 19, wherein both the feed control line and the feed line are in a high impedance state during the touch sensor driving period.

21. The touch sensing device of claim 19, wherein the feed control line receives a voltage that is lower than the threshold voltage of the first TFT and the second TFT and the feed line is in a high impedance state during the touch sensor driving period.

22. The touch sensing device of claim 19, wherein both the feed control line and the feed line receive an alternating current (AC) signal that is in a same phase with the touch driving signal during the touch sensor driving period.

23. The touch sensing device of claim 22, wherein each of the pixels comprises a pixel TFT, and the voltage of the touch driving signal and the voltage of the AC signal are lower than a threshold voltage of the pixel TFT.

* * * * *